Dec. 8, 1953

E. BUHLER 2,661,684

CHECK WRITING INTERPRETER

Filed April 6, 1949

15 Sheets-Sheet 1

INVENTOR
EUGEN BUHLER
BY Ralph C. Dustin
ATTORNEY

Dec. 8, 1953 E. BUHLER 2,661,684

CHECK WRITING INTERPRETER

Filed April 6, 1949 15 Sheets-Sheet 2

INVENTOR
EUGEN BUHLER
BY Ralph C. Austin
ATTORNEY

Dec. 8, 1953 E. BUHLER 2,661,684

CHECK WRITING INTERPRETER

Filed April 6, 1949 15 Sheets-Sheet 3

INVENTOR
EUGEN BUHLER
BY Ralph C. Austin
ATTORNEY

Dec. 8, 1953

E. BUHLER 2,661,684

CHECK WRITING INTERPRETER

Filed April 6, 1949

15 Sheets-Sheet 4

INVENTOR
EUGEN BUHLER
BY Ralph C. Austin
ATTORNEY

Dec. 8, 1953 E. BUHLER 2,661,684

CHECK WRITING INTERPRETER

Filed April 6, 1949 15 Sheets-Sheet 5

INVENTOR
EUGEN BUHLER
BY Ralph C. Dustin
ATTORNEY

Dec. 8, 1953

E. BUHLER 2,661,684

CHECK WRITING INTERPRETER

Filed April 6, 1949

15 Sheets-Sheet 6

INVENTOR
EUGEN BUHLER
BY Ralph C. Dustin
ATTORNEY

Dec. 8, 1953

E. BUHLER 2,661,684

CHECK WRITING INTERPRETER

Filed April 6, 1949

15 Sheets-Sheet 7

INVENTOR
EUGEN BUHLER
BY Ralph C. Dustin
ATTORNEY

Dec. 8, 1953

E. BUHLER 2,661,684

CHECK WRITING INTERPRETER

Filed April 6, 1949

15 Sheets-Sheet 8

INVENTOR
EUGEN BUHLER
BY Ralph C. Dustin
ATTORNEY

Dec. 8, 1953 E. BUHLER 2,661,684

CHECK WRITING INTERPRETER

Filed April 6, 1949 15 Sheets-Sheet 9

INVENTOR
EUGEN BUHLER
BY Ralph C. Dustin
ATTORNEY

INVENTOR
EUGEN BUHLER
BY Ralph C. Dustin
ATTORNEY

Dec. 8, 1953

E. BUHLER 2,661,684

CHECK WRITING INTERPRETER

Filed April 6, 1949

15 Sheets-Sheet 11

INVENTOR
EUGEN BUHLER
BY Ralph C. Dustin
ATTORNEY

Dec. 8, 1953

E. BUHLER 2,661,684

CHECK WRITING INTERPRETER

Filed April 6, 1949

15 Sheets-Sheet 12

INVENTOR
EUGEN BUHLER
BY Ralph E. Dustin
ATTORNEY

INVENTOR
EUGEN BUHLER
BY Ralph C. Dustin
ATTORNEY

INVENTOR
EUGEN BUHLER
BY Ralph C. Dustin
ATTORNEY

INVENTOR
EUGEN BUHLER
BY Ralph C. Dustin
ATTORNEY

Patented Dec. 8, 1953

2,661,684

UNITED STATES PATENT OFFICE 2,661,684

CHECK WRITING INTERPRETER

Eugen Buhler, Poughkeepsie, N. Y., assignor to International Business Machines Corporation, New York, N. Y., a corporation of New York Application April 6, 1949, Serial No. 85,892

15 Claims. (Cl. 101—93)

This invention relates to machines for printing the required data upon cards to form checks, and more particularly to machines for preparing checks upon which data is printed in response to impulses received from devices sensing perforations in the checks.

To this end there is provided means for feeding perforated cards one at a time past sensing devices to a position at one side of a plurality of printing elements from which data is to be printed. Each of the cards is stopped in its printing position while hammers are operated to force the card against the printing elements, and then the card is fed to an ejector which delivers it to a receiving hopper. Some of the printing elements may be adjusted manually before the machine is started, for printing the signature, the date, the object for which the check is drawn, and any other information that may be desired. Other printing elements are adjusted by means operating in response to electrical impulses received from the sensing devices as the cards are moved to their printing position. For printing the cash amount on the check, there are provided two sets of print wheels, one set having elements for printing the value in small type and the other set having elements for printing in large type. The wheels of each set for printing the dollar values are provided with elements which may be positioned to print any one of the digits 0 to 9 or an asterisk. The adjusting of each of the wheels to locate its elements in any one of these positions is accomplished by means operating in response to an impulse received as a result of a hole punched in the cards at only one of nine points. The controls for the two sets of printing wheels are tied together electrically so as to assure that the amounts printed are the same provided the cash total of the checks printed as indicated by an accumulator is equal to a predetermined total. In order to obtain a checking of the holes in the cards representing the cash amount, different sets of devices are arranged to sense the holes at different points in its path of travel, and the adjustment of one set of cash print wheels is made dependent upon each set of sensing devices.

In addition to the cash print wheels there may be provided other wheels having elements for printing the check number, the voucher number and a control number. These wheels are adjustable by means operating either in response to impulses received from devices sensing holes in different portions of the cards or in response to impulses received from a device which is adjustable to transmit any desired combination of impulses.

Separate hammers may be provided for effecting a printing of the different items. If it is desired that some of the items be left off the check, the corresponding hammers may be locked out by manually adjustable locking means. The machine may be used to print all items except the signature by locking out the hammer for the latter, or it may be used only for signing checks by locking out all hammers except that for the signature. If desired, the machine may be operated with all of its hammers locked out while checks are passed through to obtain a proof total of the cash values from an accumulator which operates in conjunction with the printing wheels.

An object of this invention is to provide an improved machine for printing data on cards to form checks.

Another object is to provide an improved check writing machine which is adjustable to print simultaneously all or any part of the items required on a card to form a check.

Still another object is to provide in a check writing machine improved means for adjusting a printing element in any one of eleven positions in response to an impulse received as the result of a hole formed in a card at only one of nine different points.

Yet another object is to provide an improved check writing machine having two sets of wheels for printing the cash value on the check, and having means for adjusting the wheels in response to impulses received from different sets of devices which sense perforations in the card at different points in its travel.

Still another object is to provide means which are dependent upon the operation of controls for one set of cash printing wheels and which operate to control the adjustment of a second set of cash printing wheels so as to assure that the amounts printed by each are the same.

Another object is to provide adjustable means for printing numbers (such as a check number, a voucher number and a control number) on a card, and adjusting said means by impulses received either from devices sensing perforations in the card or from a manually regulated transmitting device.

Other objects of the invention will be pointed out in the following description and claims and illustrated in the accompanying drawings, which disclose, by way of example, the principle of the invention and the best mode, which has been contemplated, of applying that principle.

Figure 6:
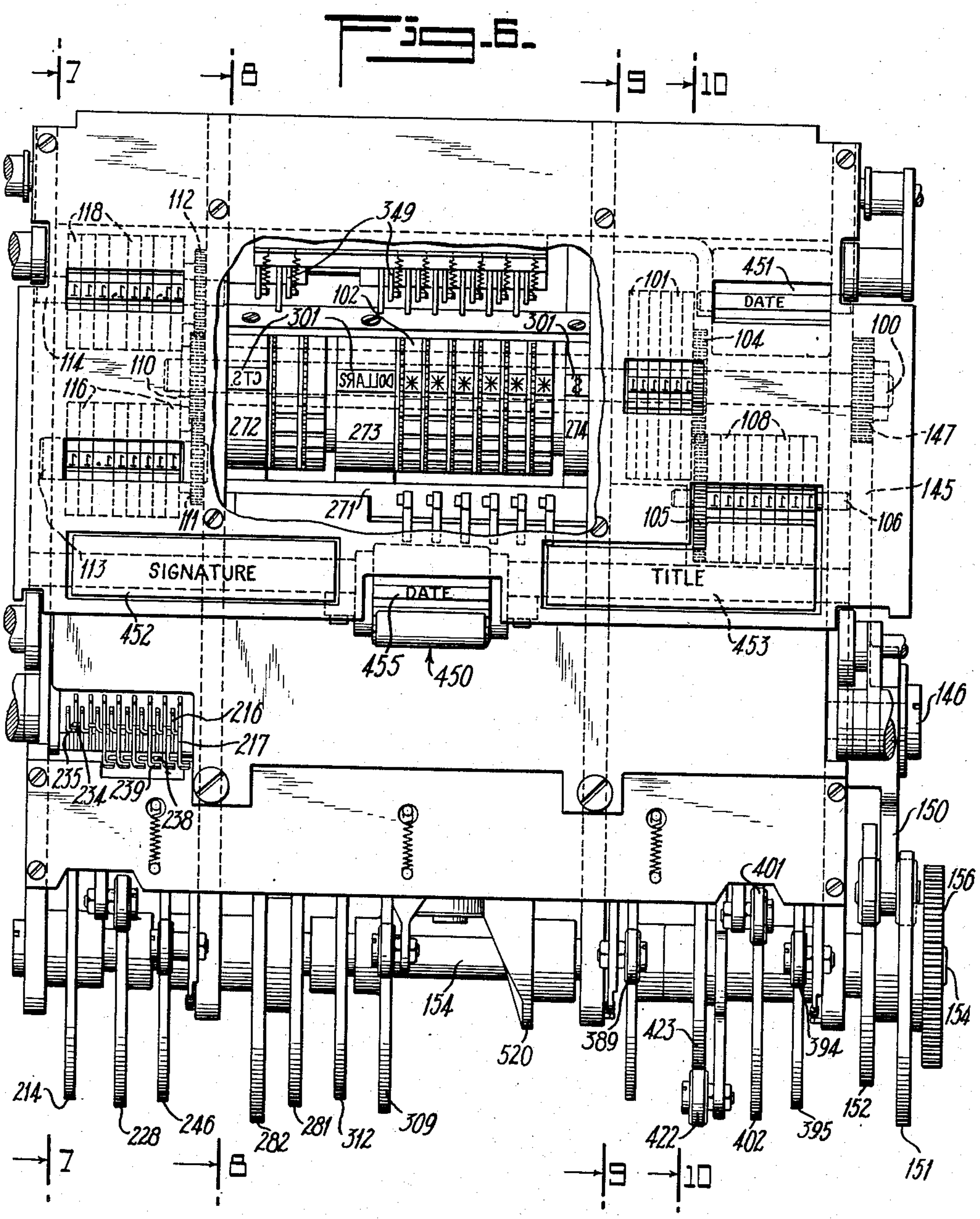
Fig. 6 is a plan view showing the printing wheels and operating mechanisms therefor.

Figs. 7, 8, 9 and 10 are vertical sectional views taken on the planes of lines 7—7, 8—8, 9—9, and 10—10 of Fig. 6.

Figure 11:
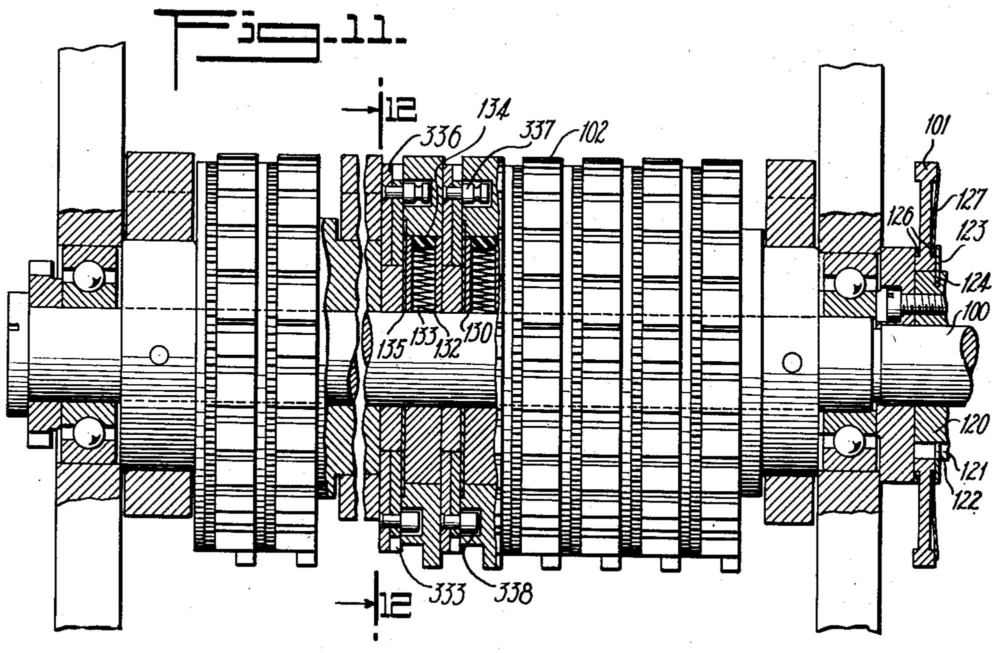

Fig. 11 is an enlarged view showing the wheels for printing the cash value in large type, partly in elevation and partly in section, and showing one of the control number print wheels in section.

Figure 12:
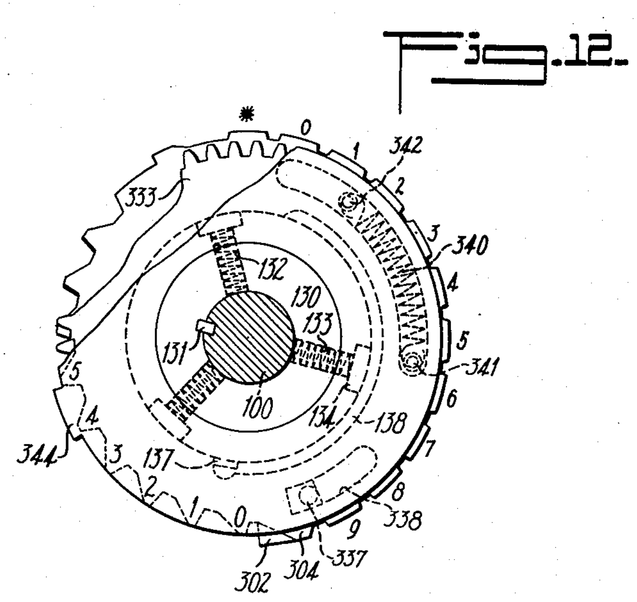

Fig. 12 is a view taken on the plane of the line 12—12 of Fig. 11 with parts broken away to facilitate illustration.

Figure 13:
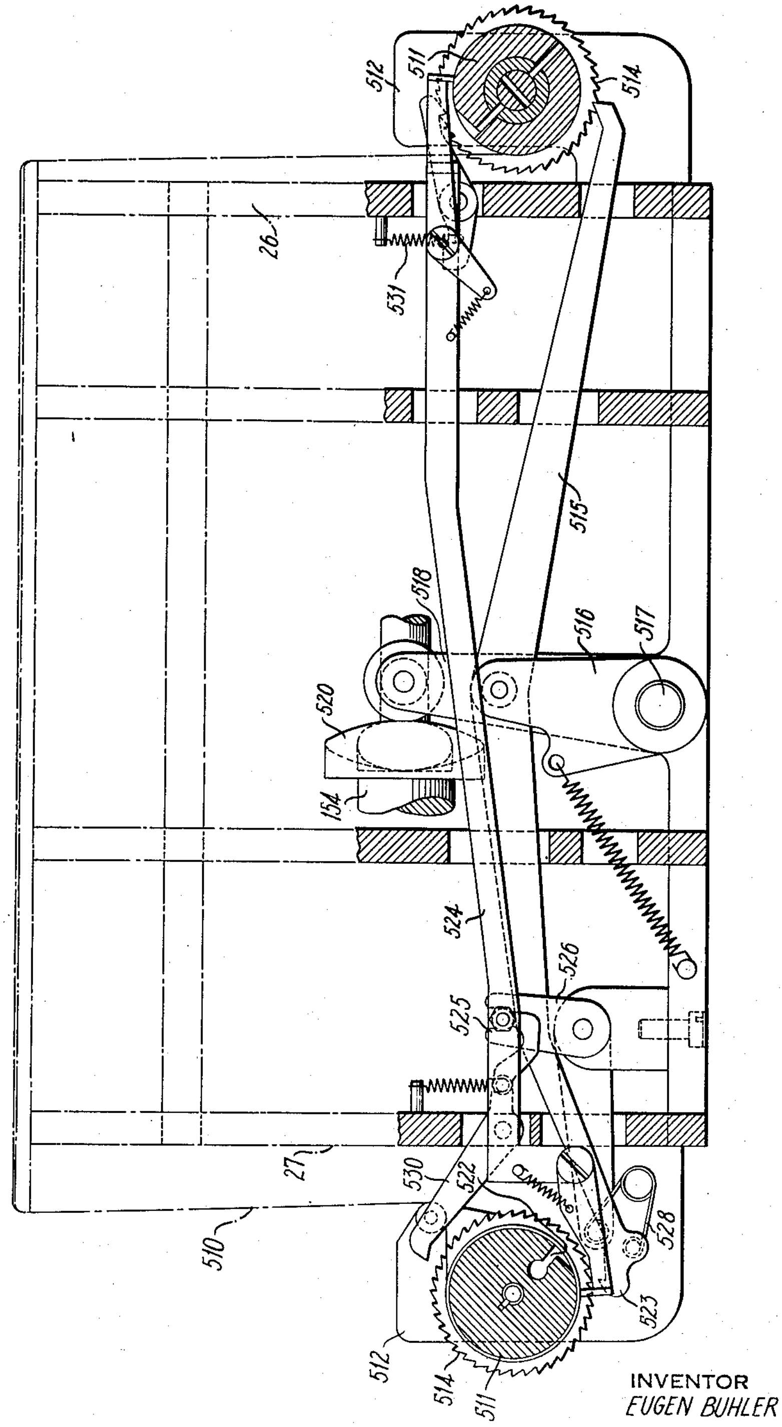

Fig. 13 is a vertical sectional view showing the ribbon feed mechanism.

Figure 14A:
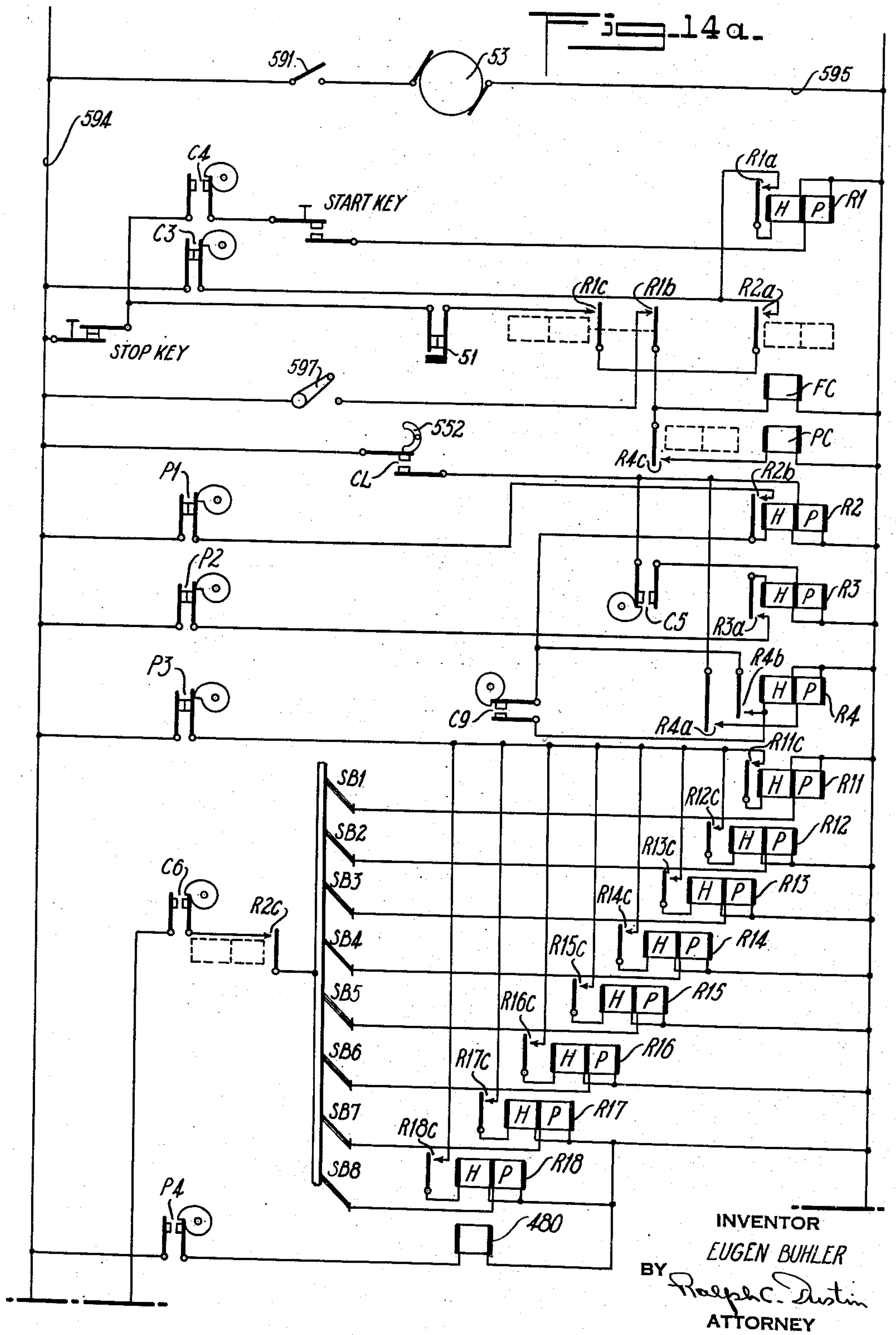
Figure 14B:
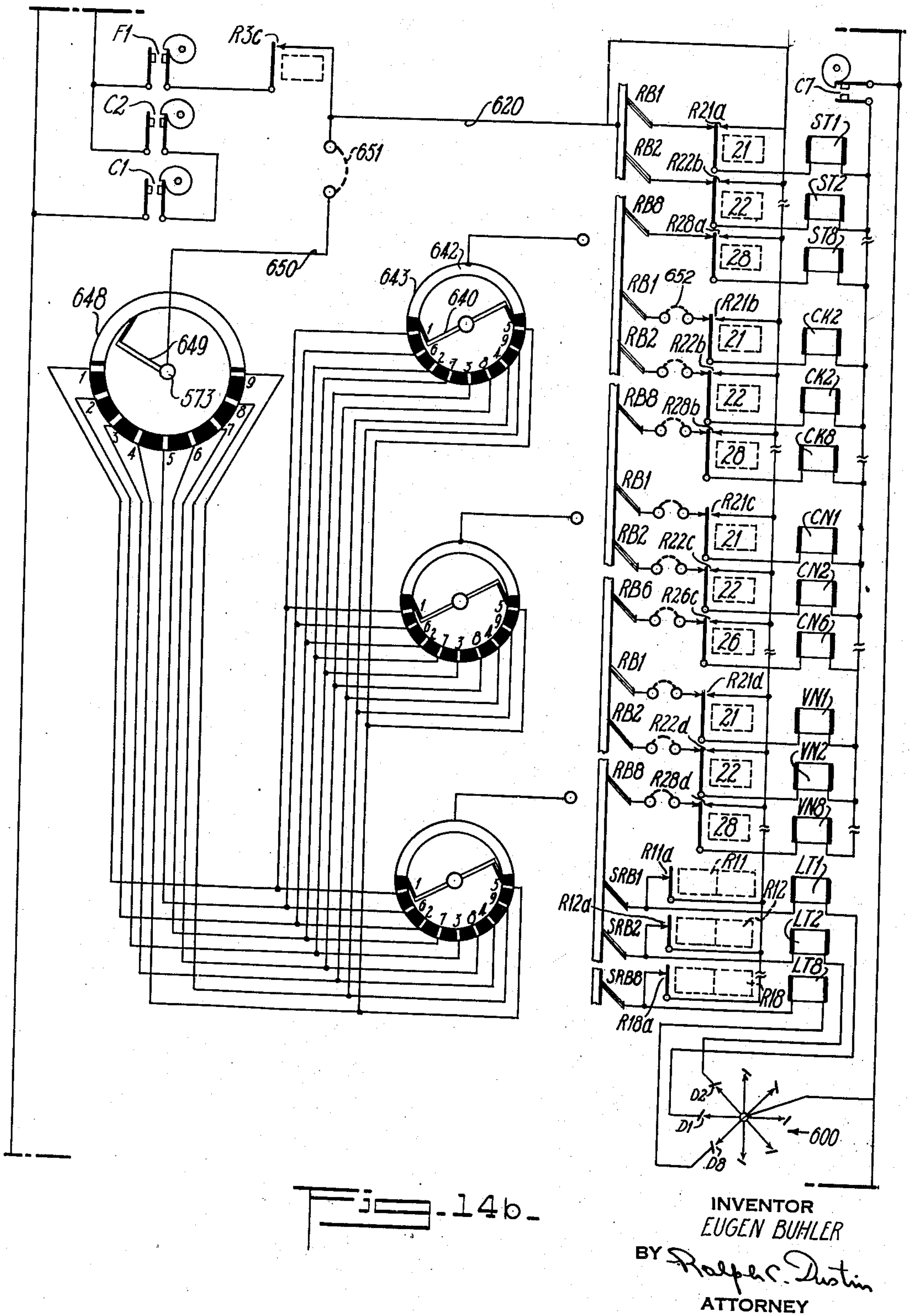
Figure 14C:
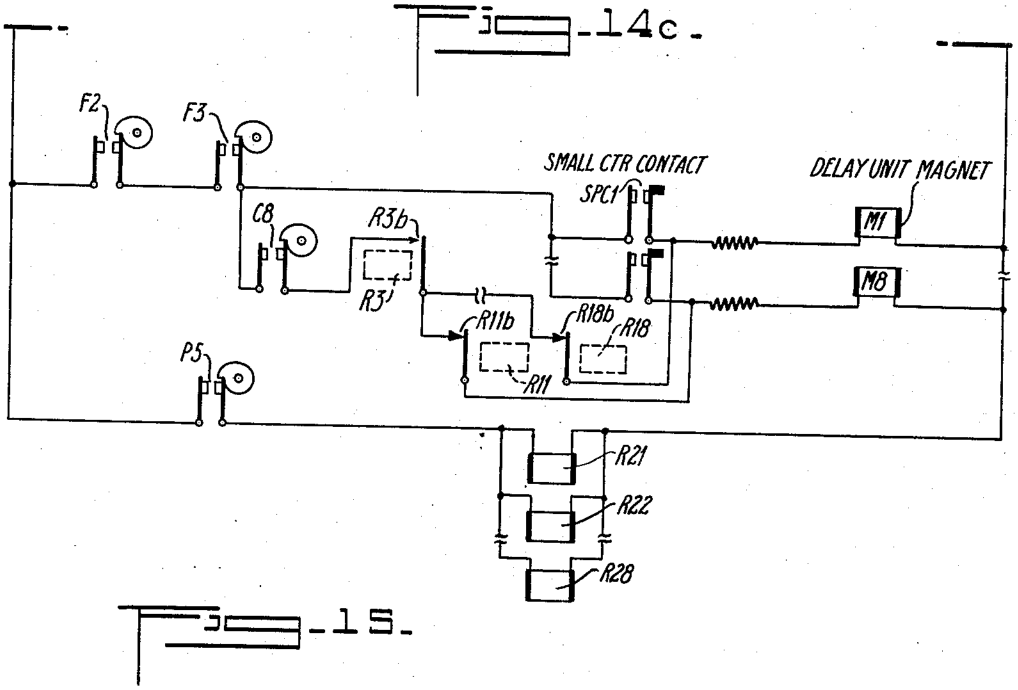

Figs. 14*a*, 14*b* and 14*c*, taken together and arranged vertically in the order named, constitute a wiring diagram for the machine.

Figure 15:
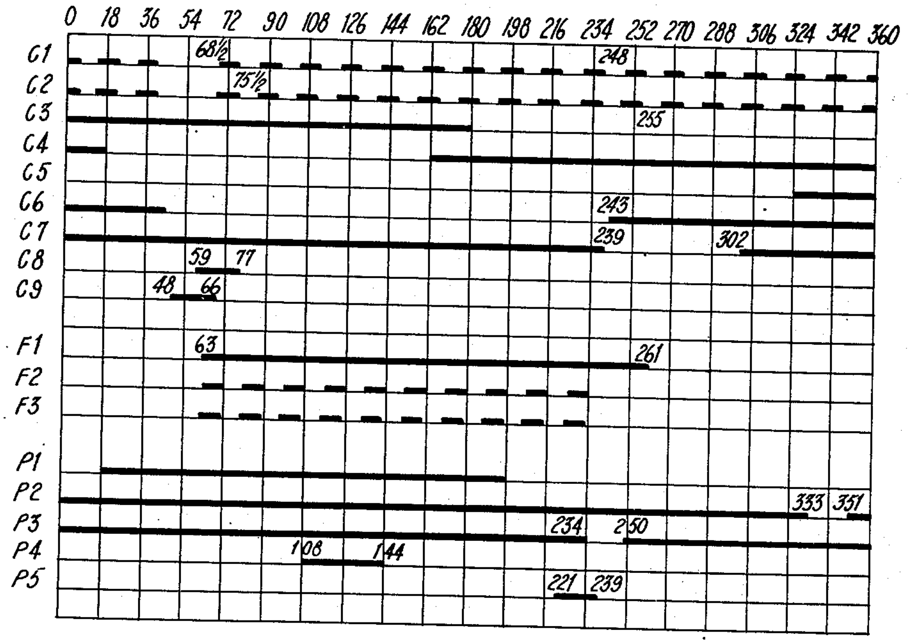

Fig. 15 is a time chart of the cam controlled contacts.

*Card feed mechanism*

Figure 4:
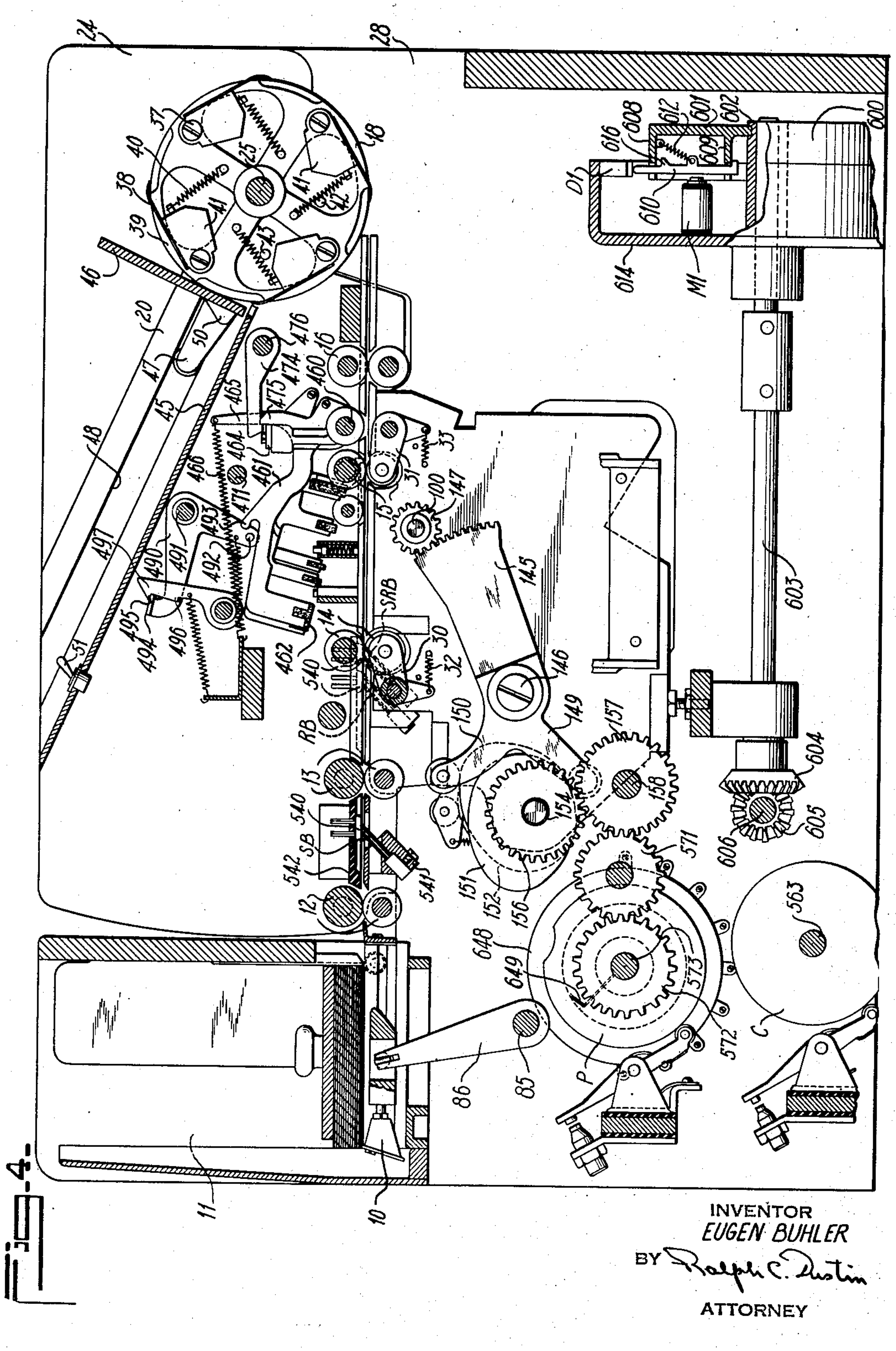
Fig. 4 is a vertical sectional view taken on the plane of the line 4—4 of Fig. 1.

In the illustrative embodiment of the invention there is provided, as shown in Fig. 4, a picker 10 which is adapted to move cards one at a time from the bottom of a card stack in a feed hopper 11 through the usual throat to a pair of feed rolls 12, through which they are advanced to succeeding pairs of feed rolls 13, 14, 15 and 16. An ejector 18 picks up the cards after they pass the feed rolls 16 and carries them to a receiving hopper 20 where they are deposited. The pairs of feed rolls 12, 13, 16 and the upper feed roll 15 are mounted upon shafts which are journaled at their ends (see Fig. 1) in side plates 22 and 23 of an upper frame structure 24, which is pivotally supported at one end by a shaft 25 journaled in the side plates 26 and 27 of a lower frame structure 28. The upper feed roll 14 is mounted on a stub shaft 29 journaled in the side plate 23, and a corresponding roll 14′ at the opposite side of the machine is mounted on a stub shaft 29′ journaled in the side plate 22. The lower feed rolls 14 and 15 are rotatably carried by levers 30 and 31 which are pivotally connected to the side plate 27 of the lower frame structure and are urged by springs 32 and 33 in a direction to hold the lower feed rolls in yieldable engagement with the upper feed rolls. Suitable abutment pins are provided, as shown, for limiting the movement of the levers by the springs when the frame structure 24 is swung upwardly about the shaft 25. Similar feed rolls are supported at the opposite side of the machine by levers which are pivotally connected to the side plate 26 of the lower frame structure. During the operation of the machine, the upper frame structure is locked, by suitable means not shown, in the position of Fig. 4, but in the event that a card becomes damaged while passing through the machine, this structure may be rocked upwardly for removal of the card.

Figure 1:
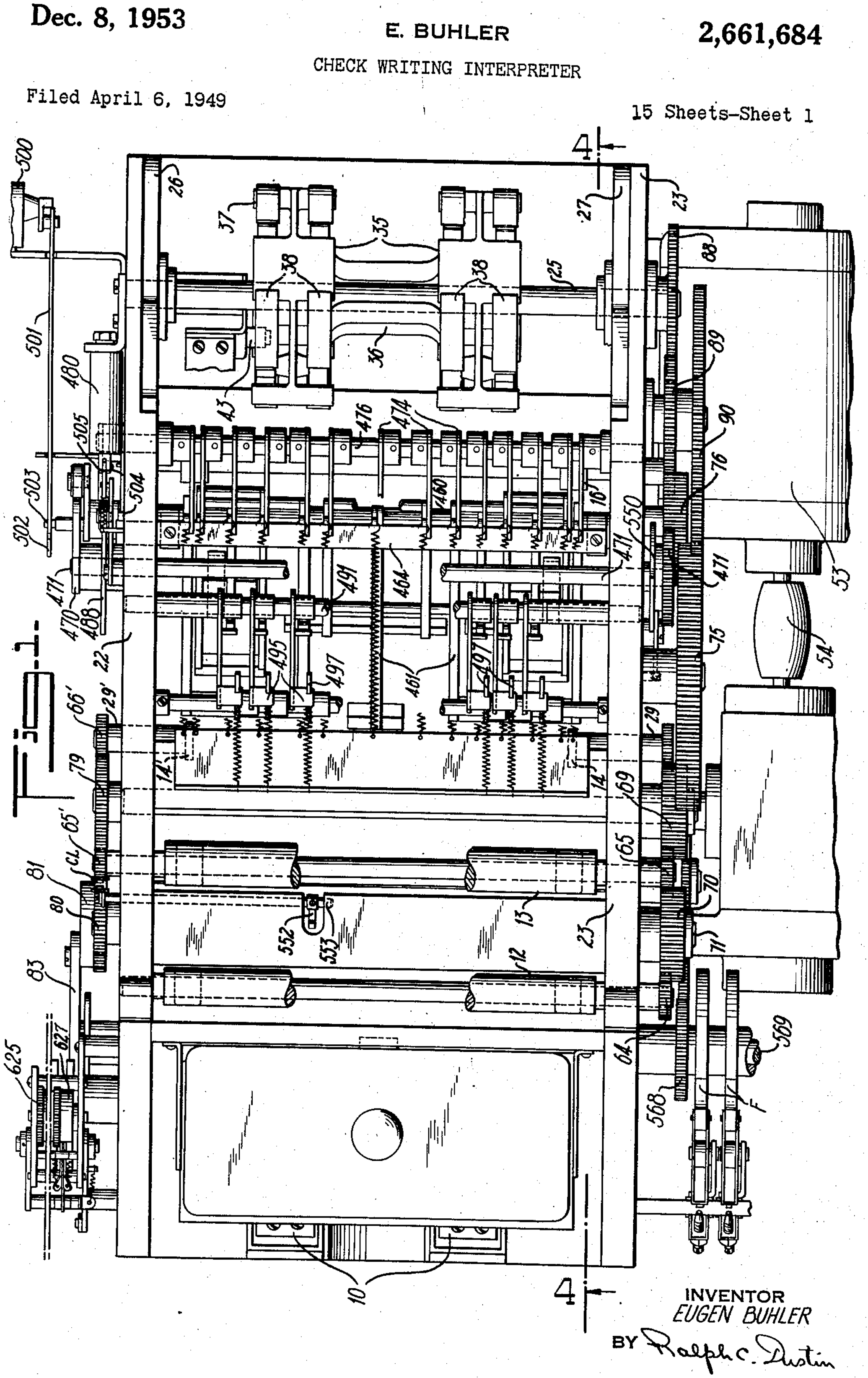
Fig. 1 is a plan view with parts broken away to facilitate illustration, showing the card feeding mechanism and the printing hammers with their operating mechanisms.

The ejector 18 comprises, as shown in Figs. 1 and 4, a pair of wheels 35 fixed to the shaft 25 at points spaced from each other. Extending between the wheels are U-shaped members 36 which are pivotally connected at their ends to the wheels at points 37 adjacent their peripheries. Fixed to each leg of the U-shaped members are fingers 38 which extend across recesses 39 in the peripheries of the wheels and are normally held by springs 40 in engagement with the wheels at the trailing edges of the recesses. Cam blocks 41 are connected to the U-shaped members and are adapted to engage a stationary pin 42 for swinging the members in a direction to move the fingers away from the periphery of the wheel so that the leading edge of the cards may move under them as they are advanced from the feed rolls 16. After the edge of a card is moved under the fingers 38, the cam block 41 rides off the pin 42 so that the fingers operate to clamp the card between themselves and the wheel so as to carry it to the receiving hopper. As the card approaches the hopper 20, the cam block engages a pin 43 to move the fingers away from the wheel for releasing the card and depositing it in the hopper when it engages a projecting lower plate 45.

A plate 46 is slidably received within the hopper and is provided with arms 47 carrying rollers which are received in guideways 48 formed in the side walls of the hopper for holding the plate in a position perpendicular to the bottom plate 45. As the cards are deposited in the receiving hopper, the plate 46 is moved along the bottom plate 45 until a projecting portion 50 carried by the plate engages a switch arm 51 for opening a circuit and stopping the machine.

Figure 2:
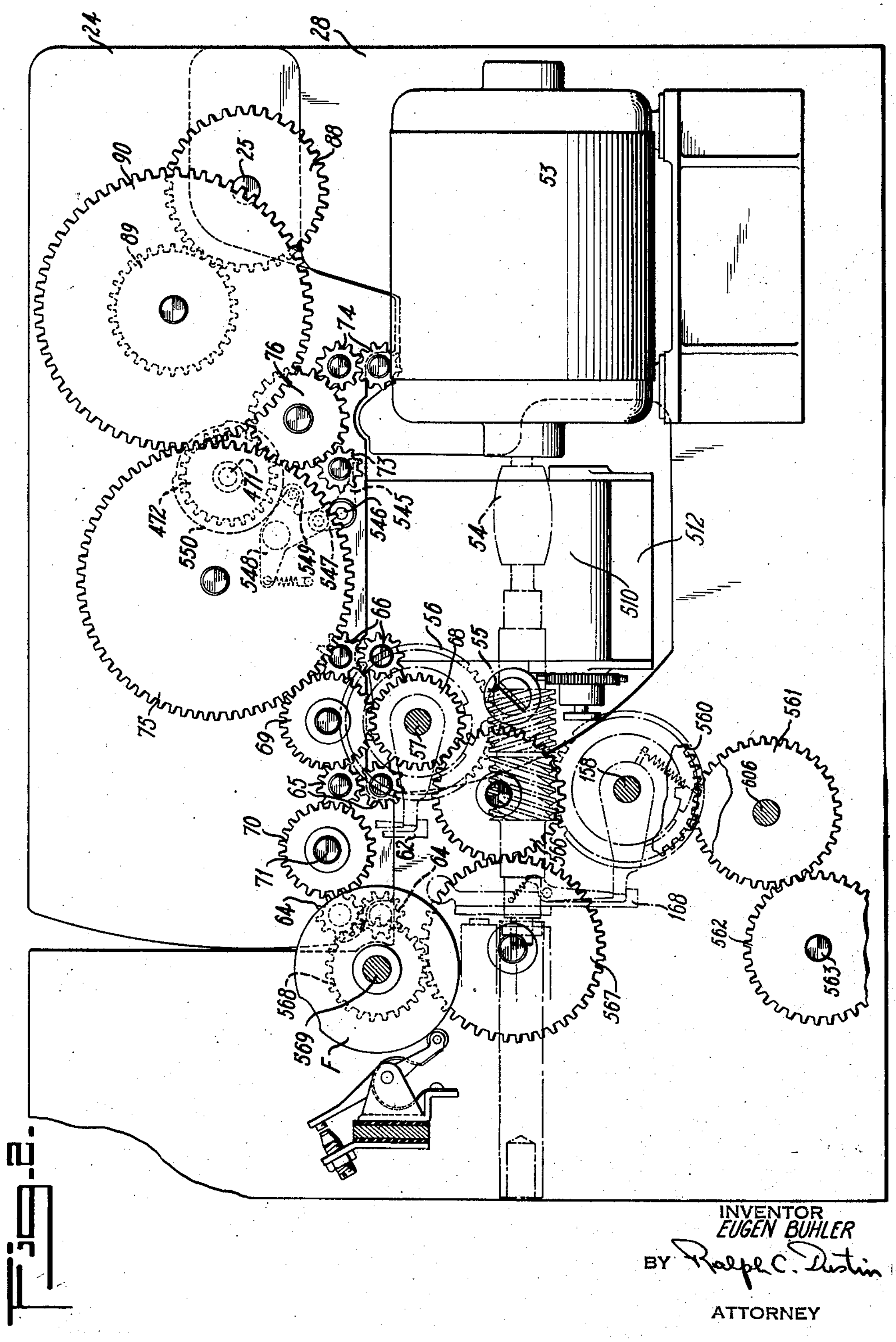
Fig. 2 is an elevational view of the check writing machine taken at the right-hand side of Fig. 1.
Figure 3:
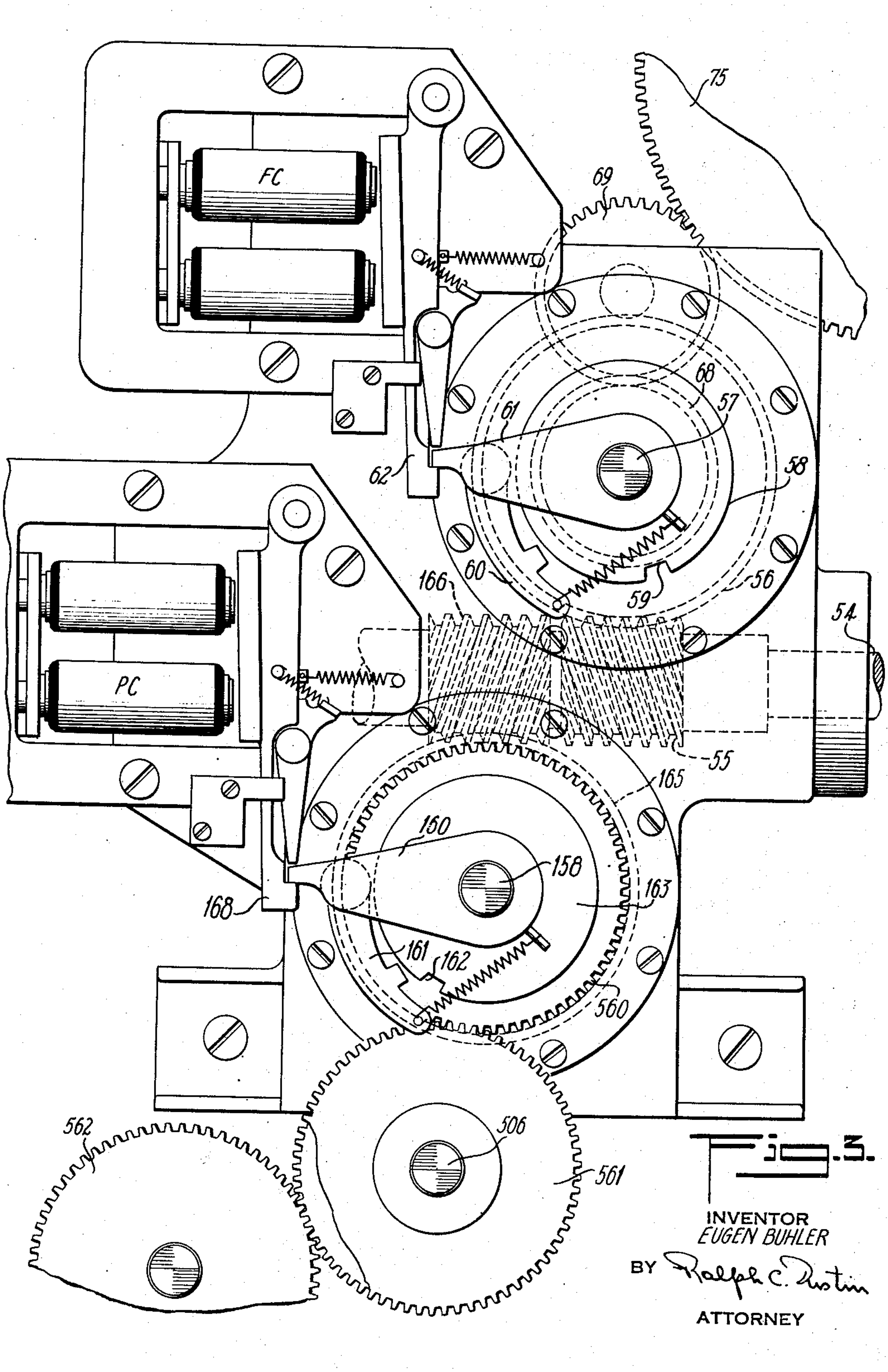
Fig. 3 is an enlarged elevational view taken at the right-hand side of Fig. 1 and showing the clutch mechanisms for controlling the feeding and printing operations.

For driving the picker, the feed rolls and the ejector, there is provided, as shown in Fig. 2, a motor 53 fixed to the side of the lower frame structure 28 and having a power shaft 54 which operates through a worm 55 to drive a worm gear 56 freely mounted upon a shaft 57. As shown in Fig. 3, a clutch plate 58 of a feed clutch mechanism is connected to the gear 56 and is provided with a notch 59 which is adapted to receive a dog 60 pivotally connected to an arm 61 which is fixed to the shaft 57. An armature latch 62 of a feed clutch magnet FC normally engages the outer end of the arm 61 and a projecting portion of the dog 60 for holding them in the positions shown in Fig. 3.

For driving the feed rolls, there is connected, as shown in Figs. 1 and 2, to the ends of the shafts carrying the feed rolls 12, 13 and 14, meshing gears 64, 65 and 66, respectively. Fixed to the shaft 57 is a gear 68 which drives an idler gear 69 meshing with the gears 65 and 66 on the shafts of the upper feed rolls. Another idler gear 70 is journaled on a stub shaft 71 supported by the side plate 23 of the upper frame structure and meshes with the gears 64, 65 on the shafts of the upper feed rolls 12 and 13. Connected to the shaft carrying the upper feed roll 15 is a gear 73, and connected to the ends of the shafts carrying the pairs of feed rolls 16 are meshing gears 74. Gear 73 and the upper one of the gears 74 are driven from the gear 68 through idler gears 75 and 76.

When the feed clutch magnet is energized, the latch 62 releases the dog 60 and the arm 61 so that the dog may be received in the notch 59 of the clutch plate and drive the shaft 57 in a counter-clockwise direction, as viewed in Figs. 2 and 3. The gear 68 then drives the gears 65 and 66 through the idler gear 69, and the gears 64 are driven through the idler gear 70. The gears 73 and 74 on the feed rolls 15 and 16 are driven at the same time through the idler gears 75 and 76. In order to drive the feed roll 14' at the opposite side of the machine, there is provided, as shown in Fig. 5, an idler gear 79 meshing with gears 65' and 66' on the shafts carrying the feed rolls 13 and 14'.

Figure 5:
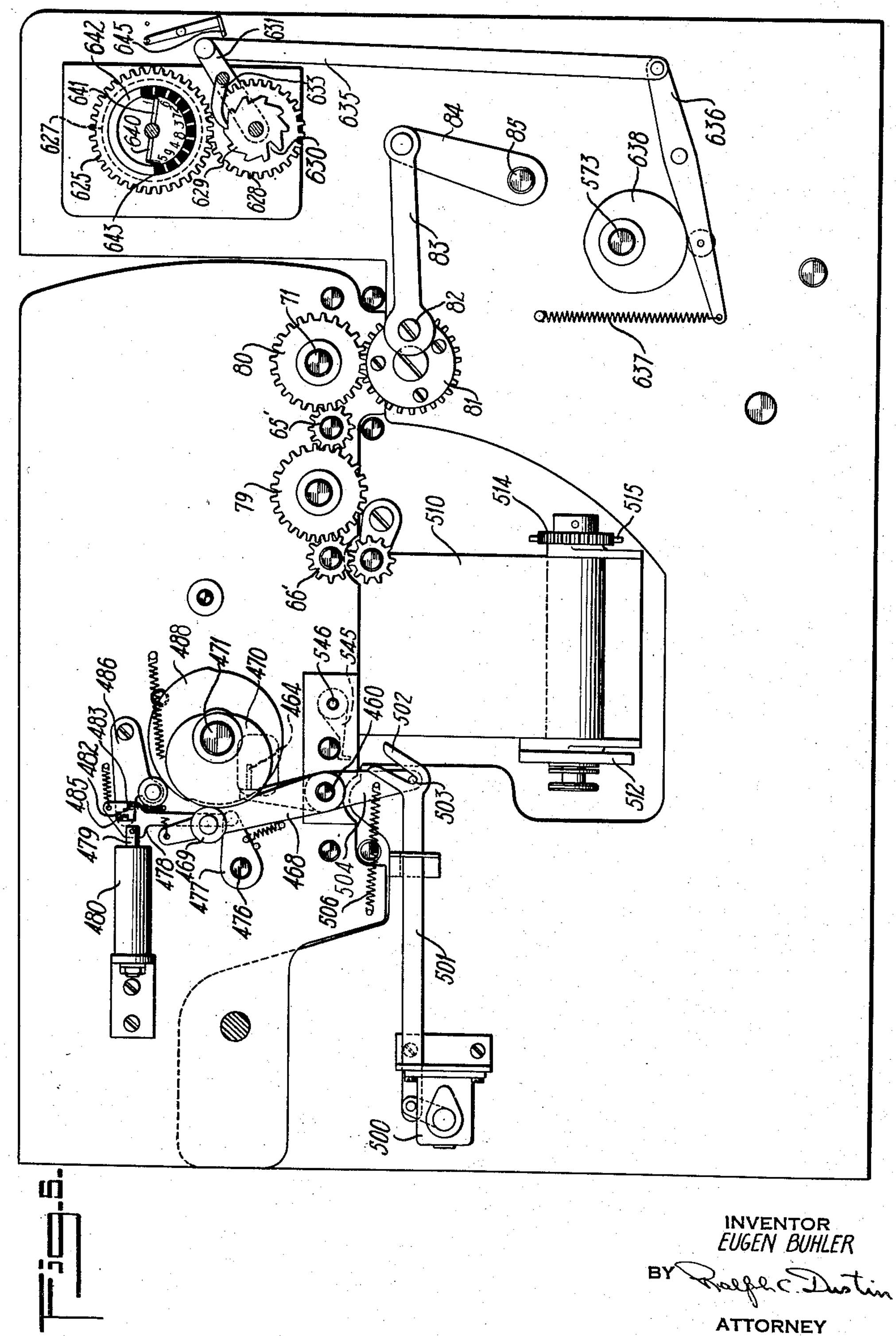
Fig. 5 is an elevational view of the machine taken from the left-hand side of Fig. 1.

For oscillating the picker 10, there is provided, as shown in Figs. 1 and 5, an idler gear 80 driven by the gear 65' and meshing with a gear 81 carrying an eccentric pin 82 to which a link 83 is pivotally connected. The opposite end of the link is connected to an arm 84 fixed upon a shaft 85 to which there are connected, as shown in Fig. 4, arms 86 operatively engaging the picker 10 for oscillating the latter.

In order to rotate the ejector wheels 35, there is connected to the shaft 25 a gear 88 meshing with a gear 89 which is fixed for rotation with a gear 90 on a stub shaft carried by the side plate 23 of the upper frame structure. The gear 90 meshes with the gear 75 and is driven by the latter in a direction to effect a counter-clockwise rotation of the ejector wheels.

*Printing mechanism*

Referring to Figs. 4 and 6, it will be noted that a shaft 100 extends transversely of the machine and is journaled in the lower frame structure 28. Mounted upon this shaft are two sets of print wheels, one set of wheels 101 being adapted to print a control number upon the card and the other set of wheels 102 being adapted to print the cash value in large type upon the card. Fixed to the shaft 100 is a gear 104 meshing with a gear 105 fixed to a shaft 106 upon which there is mounted a set of print wheels 108 for printing a voucher number upon the check. At the other end of the shaft 100 is a gear 110 meshing with gears 111 and 12 fixed to shafts 113 and 114 respectively, journaled in the lower frame structure. Mounted upon the shaft 113 is a set of wheels 116 for printing the cash value of the check in small type, and mounted upon the shaft 114 is a set of print wheels 118 for printing the number of the check.

In Fig. 11 the print wheels 101 are shown mounted upon a sleeve 120 which is fixed for rotation with the shaft 100 by any suitable means, not shown. Formed in the sleeve 120 is a longitudinal slot 121 and peripheral grooves 122, the grooves being located so that one is at a side of each of the wheels. Annular plates 123 are slidably mounted upon the sleeve 120, and each is provided with an inwardly projecting portion 124 which is movable in the longitudinal slot 121 as the plate is adjusted along the sleeve to a point above one of the grooves. The portion 124 may then be moved into the groove 122 by rotating the plate, for locking the latter in place. At each side of the wheel 101 is a fiber ring 126, and arranged between one of these rings and the plate 123 is an annular member 127 of spring steel engageable at its outer edge with a projecting ridge on the wheel adjacent its periphery. When the parts are assembled, the member 127 is held in a flexed position, as shown, to produce a frictional engagement between the parts for resisting rotation of the wheel 101 relative to the shaft 100. Each wheel of the sets 108, 116 and 118 is mounted in a similar manner so that they are rotated with their respective shafts unless held against rotation by means which will be shortly described.

Each of the large print wheels 102 is mounted upon a collar 130 which is keyed at 131 to the shaft 100, as shown in Fig. 12. Extending radially through the collar 130 are openings 132 containing springs 133 which act between the shaft 100 and friction shoes 134 for holding the latter in frictional engagement with the inner periphery of the wheel 102. At one side of each of the wheels is an annular plate 135 fixed to the shaft 100 by any suitable means and having a projecting portion 137 (Fig. 12) which extends into an arcuate groove 138 formed in the inner periphery of the print wheel. When the wheel is in its home position, as shown in Fig. 12, the projecting portion 137 engages one end of the groove 138. If the print wheel is held against rotation while the shaft 100 rotates in a counter-clockwise direction, the projecting portion 137 moves forwardly into the groove 138. In the event that the print wheel fails to rotate with the shaft when the latter is turned in a clockwise direction, the projecting portion 137 engages the end of the groove 138 and returns the wheel to its home position.

*Drive mechanism for print wheels*

During the operation of the machine, the shaft 100 is oscillated so that the print wheels may be moved to their various printing positions under the control of means shortly to be described and then returned again to their home positions. For oscillating the shaft 100 there is provided, as shown in Fig. 4, a gear sector 145 pivotally mounted at 146 upon the lower frame structure and meshing with a gear 147 fixed to the shaft 100. Extending from the gear sector are forked arms 149, 150 carrying rollers which operatively engage complementary cams 151, 152 fixed to a shaft 154. Mounted upon the shaft 154 is a gear 156 which meshes with a gear 157 fixed to a shaft 158. Connected to the shaft 158, as shown in Fig. 3, is an arm 160 carrying a dog 161 which is adapted to be received within a notch 162 formed in a clutch plate 163 freely mounted upon the shaft 158. Fixed to the clutch plate 163 for rotation therewith is a worm gear 165 meshing with a worm 166 carried by the power shaft 54 of the motor 53. An armature latch 168 is controlled by a printing clutch magnet PC and is adapted to engage the outer end of the arm 160 and a projecting portion of the log 161 for holding them normally in the positions shown in Fig. 3. When the magnet PC for the printing clutch is energized, the armature latch 168 is operated to release the arm 160 and the dog 161 so that the latter is received in the notch 162 of the clutch plate for effecting a rotation of the shaft 158 in a counter-clockwise direction. As the shaft 158 rotates, the gear 157 drives the gear 156 and operates the cams 151, 152 to effect an oscillating motion of the gear sector 145 driving the gear 147 and the shaft 100.

*Control mechanism for small type cash wheels and check number printing wheels*

Figure 7:
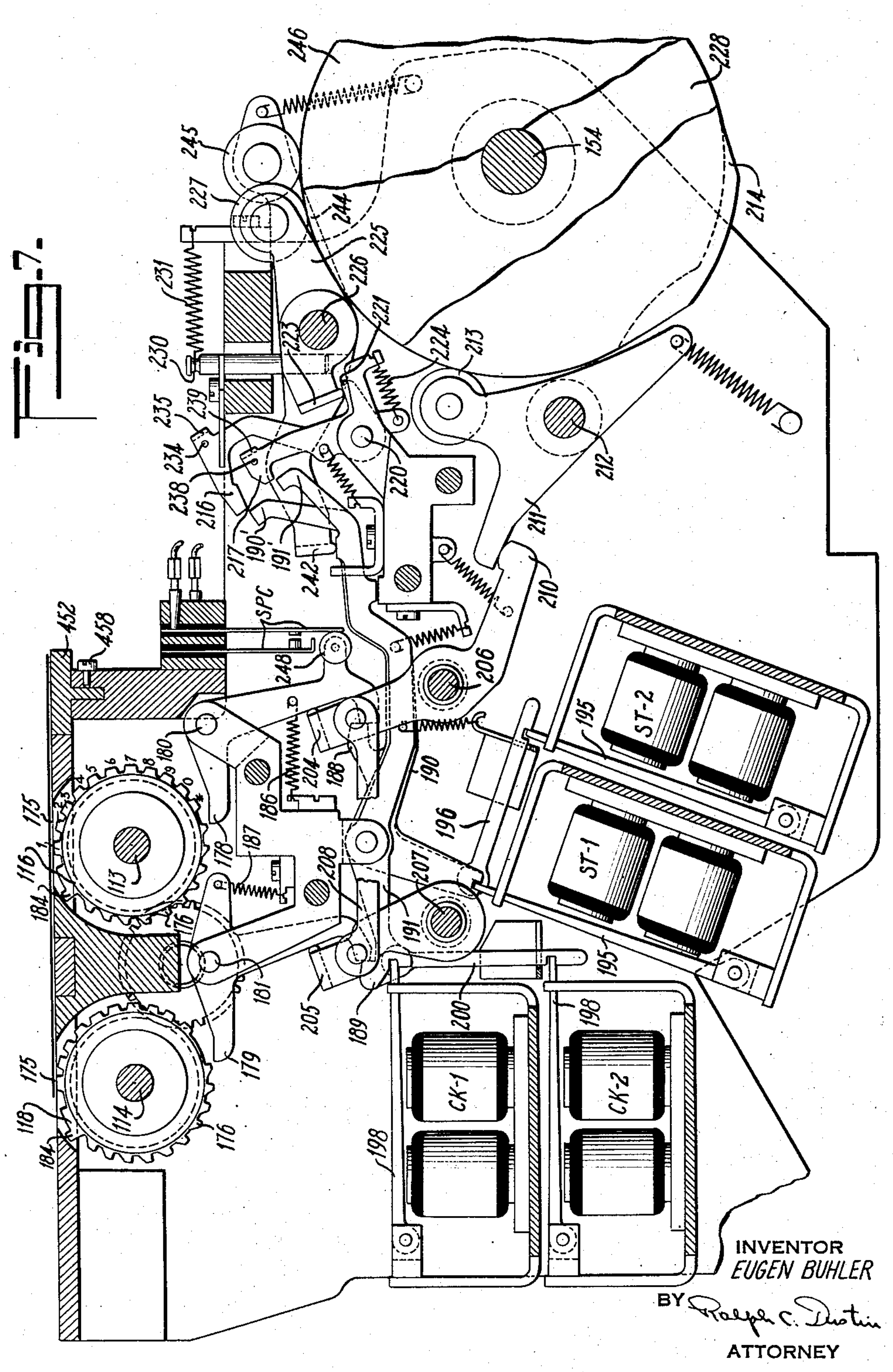

The wheels 116 for printing the cash value of the check in small type, and the wheels 118 for printing the check numbers, are provided, as shown in Fig. 7, with printing elements 175 along a portion of their peripheries and teeth 176 along an opposite portion of their peripheries. The printing elements for the wheels 116 are adapted to print any one of the significant digits 1 to 9, the 0 or an asterisk, while the elements for the wheel 118 are adapted to print only the numbers 1 to 9 and 0. The space between the 0 element and the #1 tooth on the print wheels 118 is left open so that no mark is made upon the card when this portion of the wheel is in the printing position. Arranged adjacent the wheels are stop pawls 178 and 179 pivotally supported at 180 and 181, respectively, for engagement with the teeth 176 to limit rotation of the wheels in a counter-clockwise direction. Formed on each of the wheels is a projecting portion 184 which is engageable with the end of the pawl when the latter is held in its retracted position so that the element printing the asterisk for the wheel 116 or the open portion of the wheel 118 are stopped in their upper printing positions. The stop pawls 178 and 179 are urged toward the teeth 176 by springs 186 and 187, and projecting portions 188 and 189 on latch levers 190, 191 are engageable with the pawls for holding the latter in their retracted positions against the action of the springs. The latch lever 190 for the wheel 116 shown in Fig. 7 is operatively connected to the armature 195 of a small type wheel control magnet ST1, and the next adjacent lever 190 is connected by a link 196 to the armature 195 of another magnet ST2. The other latch levers for the small type print wheels are connected to the armatures of magnets which are staggered in a similar manner to conserve space. The latch lever 191 is operatively connected to the armature 198 of a check number wheel control magnet CK1, and the next adjacent lever 191 is connected by a link 200 to the armature 198 of a similar control magnet CK2. The magnets for controlling the latch levers 191 of the other wheels 118 are staggered in a similar manner.

When the magnets ST and CK are energized, the latch levers 190 and 191 are rocked in a counter-clockwise direction to release the pawls 178 and 179 for engagement with the teeth 176 of the print wheels. To return the pawls to their retracted positions there are provided bail levers 204 and 205 pivotally supported at 206 and 207 and adapted to be moved into engagement with the pawls for swinging the latter in a counter-clockwise direction. A link 208 connects the levers 204 and 205 for simultaneous movement, and an arm 210 on the lever 204 is engageable by a lever 211 pivoted at 212 and carrying a roller 213 which operatively engages a cam 214 fixed to the shaft 154.

The right-hand ends of the latch levers 190 are provided with projecting portions 190′ which are adapted to be engaged by latch members 216 for holding them in their latching positions. If any one of the latch levers 190 is rocked to unlatch its pawl 178 before its latch member 216 is moved over its portion 190′, then the end of the latch member 216 engages the side of the portion 190′ and is held out of its latching position. The latch levers 191 are provided with similar projecting portions 191′ which may be engaged by latch members 217 for holding them in their latching positions. Movement of a latch lever 191 to its unlatching position while the latch members 217 are held retracted results in a positioning of the portion 191′ for obstructing movement of its latch member 217 in a latching direction. The latch members 216 and 217 are pivotally mounted at 220 and are provided with projecting arms 221 which are engageable by a bail 223 for rocking them in a clockwise direction against the action of springs 224. The bail 223 is carried by a lever 225 pivotally mounted at 226 and carrying a roller 227 which operatively engages a cam 228 fixed to the shaft 154. A pin 230 is fixed to the lever 225 and is connected by a spring 231 to a stationary abutment for holding the roller against the cam 228. Extending laterally from each of the latch members 216 is a pin 234 which underlies, as shown in Fig. 6, a projecting portion 235 on the latch member controlling the print wheel of the next lower denomination. The latch members 217 have similar projecting pins 238 underlying projecting portions 239 of adjacent latch members. It will be appreciated that by reason of this arrangement, a holding of one of the latch members 216 in its unlatching position results in the holding of all the latch members for wheels of lower denomination in unlatching positions. The latch members for the wheels of higher denomination, however, are free to move to latching positions. The pins 238 and projecting portions 239 on the latch members 217 provide a similar control of the members 217.

The cam 228 is so shaped as to hold the bail 223 against the arms 221 of the latch members for holding the latter in their unlatching positions until the wheels 116 and 118 are rotated to positions just beyond the point where the pawls 178 and 179 may be unlatched to engage the #9 tooth on their respective wheels. If one of the magnets ST is energized to effect an operation of a pawl for engaging a tooth to stop its wheel 116 in a position for printing any one of the significant values 1 to 9, the latch lever 190 controlling such pawl engages the end of its latch member 216 and holds the latter in its unlatching position. As described above, all of the latch members 216 for the wheels of lower denomination are then held in unlatching positions while those for the wheels of higher denominations are free to move to latching positions. As soon as the wheels 116 are rotated beyond positions at which the #9 teeth may be engaged, the bail 223 is raised so that the latch members not held out may move to their latching positions. An electric impulse is then delivered to each of the magnets ST, as will be described later, for rocking the levers 190 not locked out and releasing their pawls to stop the wheels 116 in their 0 printing positions. The levers locked out by the latch members 216 continue to hold their pawls retracted so that the wheels 116 rotate to positions for printing an asterisk. The latch levers 191 are controlled in a similar manner for positioning the wheels 118 to print 0 or to present the open space beyond the 0 in printing position. After all of the printing wheels have been adjusted in their printing positions and the printing operation has been completed, the lever 211 is operated by the cam 214 to actuate the levers 204 and 205 for retracting all of the pawls, and a bail 242 is operated to move the latch levers 190 and 191 to positions for latching out the pawls 178 and 179. The bail 242 is carried by a lever 244 pivoted at 226 and carrying a roller 245 operatively engaging a cam 246 on the shaft 154.

Attached to each of the stop pawls 178 is a roller 248 controlling a pair of contacts SPC which are connected in the control circuit of Figs. 14*a*, 14*b* and 14*c*, as will be described later. The contacts are held in open positions as long as the pawl is in its retracted position, and are adapted to engage each other when the pawl is released to engage a tooth on the wheel 116.

*Control for large type cash wheels*

Figure 8:
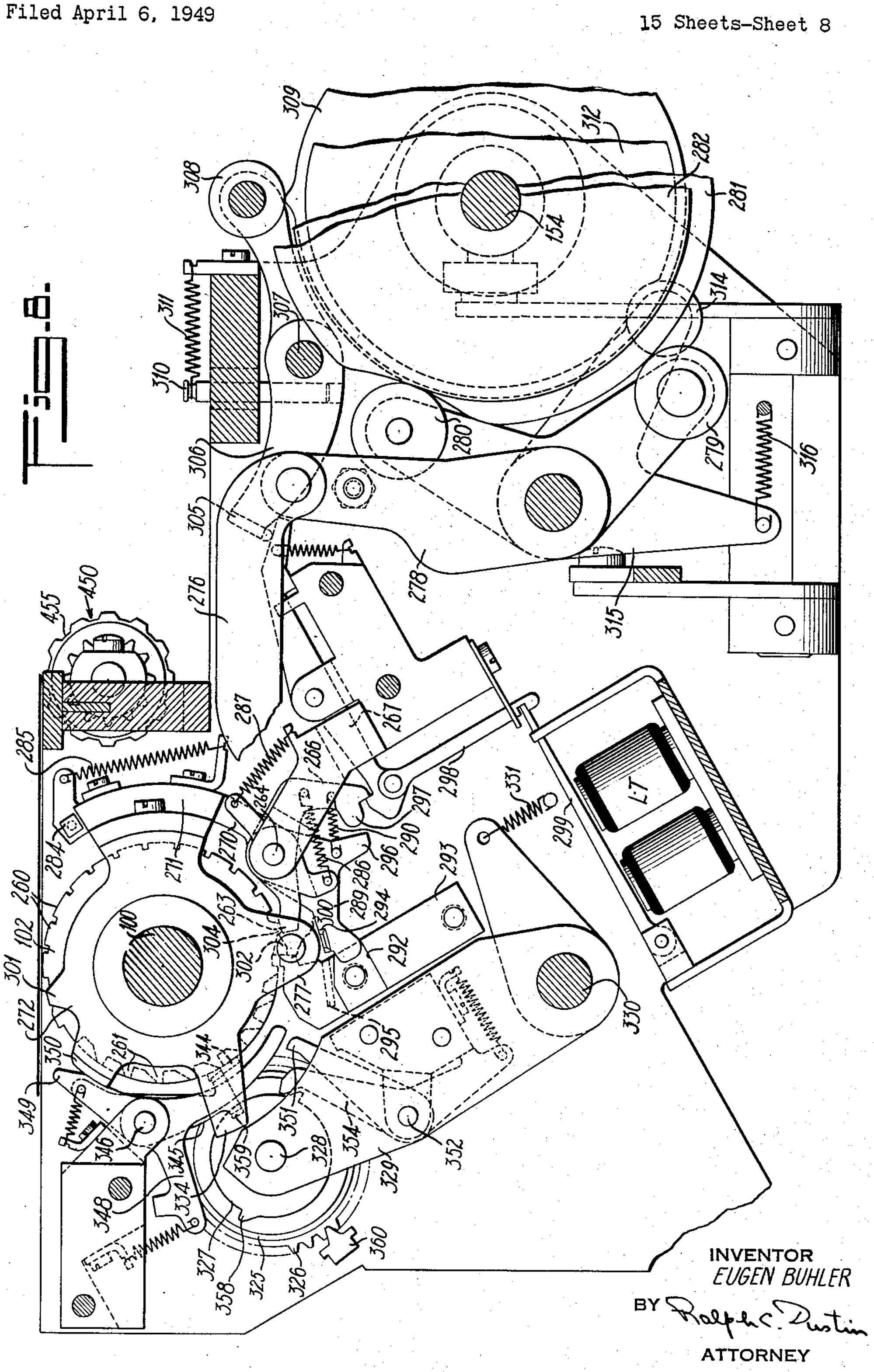

The wheels 102 for printing the dollar values in large type are provided, as shown in Figs. 8 and 12, with printing elements 260 which are adapted to print an asterisk or one of the digits 0 to 9. When these wheels are in their home positions, the elements for printing the asterisk are in printing positions. The wheels 102 for printing the cents value in large type are like the dollar wheels except that they have no asterisk printing element, and the space normally occupied by this element is left open and is located in printing position at the beginning of each operating cycle. Each of the wheels for printing the dollars and cents is provided with teeth 261 occupying 0 to 9 positions corresponding to the 0 to 9 positions of the print elements. Arranged adjacent to each of the wheels 102 is a pawl 263 pivotally supported on a pin 264 and having an arm 266 engageable by a latch lever 267 for holding it in its retracted position. The pivot pins 264 for the pawls of the dollar wheels are fixed to arcuate members 270 slidably mounted in grooves formed in a plate 271 which is connected, as shown in Figs. 6 and 8, to blocks 272, 273 and 274 rotatably supported by the shaft 100, while the pivot pins 264 for the cent wheels are mounted upon a stationary portion of the lower frame structure. The movable mounting for the pivot pins is provided so that the dollar wheels may be positioned by mechanisms which will be shortly described, to present the asterisk element in its printing position. The stationary mounting of the pivot pins for the cent wheels permits a positioning of the latter only in positions for printing 0 to 9. This is satisfactory since the cents value is insignficant, and the asterisk is printed by the dollar wheels of denominations higher than that printing the highest denomination of the check value only to prevent an increase in the value at a later date.

The blocks 272, 273 and 274 are adapted to be rocked about the shaft 100 by a link 276 connected between a projecting portion 277 on the block 272 and a lever 278 carrying rollers 279 and 280 engaging complementary cams 281 and 282 on the shaft 154. When the block 272 is in the position of Fig. 8, the upper edge of the plate 271 engages a projecting portion 284 on each of the arcuate members 270 and holds it retracted against the action of a spring 285. The pawls controlling rotation of the dollar wheels are urged toward the teeth 261 by springs 286 connected to the ends of the members 270, and the pawls controlling the cent wheels are connected by springs 287 to stationary abutments.

Pivotally supported by each of the pins 264 carried by the arcuate members 270 is a lever 289 connected to the pawl on the same pin by a spring 290 which holds it normally in engagement with a shoulder 292 on a stationary plate 293. Each of the levers 289 has a laterally projecting portion 294 positioned in line with a slot 295 in the plate 293 when the lever is held against the shoulder 292. Extending from the lever 289 is an arm 296 which is engageable by a projecting portion 297 on the pawl after predetermined movement of the latter.

It will be noted that the depth of the 0 tooth is not as great as that of the other teeth. Movement of a pawl into engagement with the 0 tooth will result in an engagement of the pawl portion 297 with the arm 296, but the position of the latter will not be changed. Movement of the pawl into engagement with any other tooth, however, will result in a swinging of the lever 289 to position its portion 294 over a solid part of the plate 293. The projecting portions 294 of adjacent levers overlap in such a manner that a rocking of any lever 289 to a position where its portion 294 overlies a solid part of the plate results in a rocking of all of the levers for the dollar wheels of lower denomination to similar positions. The levers for the wheels of higher denomination, however, remain in positions with their portions 294 overlying the slot 295.

Each of the latch levers 267 is operatively connected by a link 298 to an armature 299 of a magnet LT. When the magnet LT is energized, the latch lever 267 is rocked about its pivot to release the pawl 263 controlled thereby. Before any of the wheels 102 are rotated out of their home positions shown in Fig. 8, all of the magnets LT for the wheels, other than those which are to print a significant figure, are energized, as will be described in connection with the wiring diagram. The pawls 263 for these wheels are immediately released so that they engage the 0 teeth of their wheels when the latter are rotated to 0 printing positions. The other wheels are rotated until stopped by their pawls in positions for printing significant figures, and the one of these wheels printing the figure of highest order in the cash value determines the setting of the levers 289. The levers for the wheels of higher order remain in positions with their portions 294 overlying the slot 295, and the levers for the wheels of lower order are positioned with their portions 294 overlying a solid part of the plate 293.

After the wheels 102 have been given an opportunity to rotate to their #9 positions, the blocks 272, 273 and 274 are rocked in a clockwise direction. The arcuate members 270 having levers 289 in positions with their portions 294 overlying the slots 295, are then moved by their springs 285 in a direction to effect a clockwise rotation of the print wheels. The movement of the arcuate members is limited by engagement of the ends of the pawls with an abutment portion 300 on the plate 293. This movement is sufficient to return the print wheels to positions for printing an asterisk. The wheels for the arcuate members 270 which are held against movement either print a 0 or some one of the significant figures 1 to 9. Formed on each of the blocks 272, 273 and 274 is a projecting portion 301 which is moved into printing position as the blocks are rocked in a clockwise direction. Fixed to these portions are elements for printing Cts, Dollars and $, respectively. When the wheels have all been set up and the printing operation is completed, the shaft 100 is rotated to return the wheels to their home positions, at which time a tooth 302 on each of the wheels engages the abutment portion 300. After the 0 tooth on each of the wheels passes the pawls 263 as the wheels are returned to home positions, the pawl rides on a wheel portion 304 projecting outwardly beyond the ends of the teeth and is positioned for latching by the levers 267. As the pawls ride to the top of the portions 304, the latch levers are rocked to their latching positions by a bail 305 which is carried by a lever 306 pivoted at 307 and having a roller 308 engaging a cam 309 on the shaft 154. A pin 310 carried by the lever 306 is connected by a spring 311 to a stationary abutment for holding the roller 308 in engagement with the cam 309.

It will be noted that the cam 309 is provided with a projecting portion which rocks the lever 306 just before the print wheels reach their home positions and permits a rocking in the opposite direction as soon as the wheels are advanced again from their home positions. In order to prevent a rocking of the shaft 154 by the action of the roller 308 on the projecting portion of the cam 309, a detent cam 312 is connected to the shaft 154 and is provided with a notch which is engaged by a roller 314 when the cams are in home positions. The roller 314 is carried by a lever 315 having a spring 316 connected to one end for holding the roller against the cam.

*Accumulator for large type print wheels*

Arranged beneath the large type print wheels 102, as shown in Fig. 8, is an accumulator mechanism comprising for each denominational order of the printing wheels an indicating wheel 325, a gear 326 and a carry cam 327 fixed for rotation together on a shaft 328 which is journaled in a frame 329 pivotally supported at 330 and biased in a clockwise direction by a spring 331. Each of the gears 326 lies in the plane of a gear 333 (Figs. 11 and 12) arranged at one side of a printing wheel 102 but, as shown in Fig. 8, a camming finger 334 on the block 272 engages and holds the frame 329 in such a position that the gears 326 are out of engagement with the gears 333 while the print wheels are being moved to their printing positions. When the block 272 is rocked in a clockwise direction just prior to restoration of the print wheels, the cam finger releases the frame 329 so that the gears 326 are moved into mesh with the gears 333 to be rotated by the latter in a counter-clockwise direction an amount proportional to the digital value set upon the associated print wheel.

It will be noted that each of the print wheels is advanced one step more than the value set up. Thus for a 0 setting, the wheel is advanced one step, for a 1 setting the wheel is advanced two steps, etc. It is desired, however, that the gear 333 be rotated normally one step short of the amount of the advance so that the accumulator will not receive the extra step. To accomplish this, a disk 336 is connected, as shown in Fig. 11, to the gear 333 by members 337 which project into grooves 338 in the side of the print wheel. When the print wheel and the gear 333 are both in the extreme home position, the member 337 engages the end of the groove 338, as shown in Fig. 12. A spring 340 is connected at 341 to the wheel 102 and at 342 to the gear 333 for holding the members 337 normally in engagement with the ends of the grooves 338. Formed on the disk 336 is a projecting portion 344 which occupies the dotted line position of Fig. 8 when in the extreme home position, for engagement by a spring-urged latch 345 pivoted at 346. As the print wheel 102 is advanced, the projection 344 moves counter-clockwise and the latch 345 snaps behind it so that during the restoration of the wheel and gear, the wheel will be returned to its home position but the gear 333 will be intercepted one step short of its home position by engagement of the projection 344 with the latch 345. The spring 340 will yield to permit the relative displacement of the wheel and gear.

In order that the tens carry unit may be entered into a particular gear 326 of the accumulator, the related latch 345 is rocked clockwise while the gear is in mesh with its actuating gear 333. As a result, the spring 340 retracts the retarded gear 333 to its home position so as to advance the accumulator gear an additional step. For tripping each latch 345 there is provided a spring-urged lever 348 pivoted at 346 and having an arm 349 engageable with a plate 350 attached to the blocks 272, 273 and 274. While the print wheels are being advanced, the plate 350 lies underneath the arms 349 and holds the latches 345 in the position shown. In line with the lower end of the lever 348 is a latch 351 rotatable on a pin 352 carried by the movable frame 329. Fixed for movement with the latch 351 is an arm 354 which rides on the accumulator cam 327 of the next lower denominational accumulator gear 326. When the block 272 is rocked counter-clockwise after the setting of the printing wheels, the finger 334 first moves from under the frame 329 to enable a meshing of the gears 326 and 333 and a movement of the latch 351 into position for engagement by the lever 348. Shortly thereafter, the plate 350 moves from under the arms 349 and permits the levers 348 to swing in a clockwise direction until their lower ends engage the latches 351. With the parts in such positions, the print wheels are restored and the accumulator gears 326, together with their carry cams 327, are rotated. Whenever a gear 326 passes from a 9 to a 0 position, a projection 358 on the carry cam rocks the arm 354 and the latch lever 351 of the next higher order. As a result, the lever 348 of the next higher order is released to rock clockwise against a lateral extension 359 of the latch 345 and withdraw the latch from the path of the projection 344 so that the gear 333 may rotate with the print wheel the additional step and add an extra unit. When the accumulator gears are retracted they engage detenting teeth 360 to hold the gears against displacement and to effect an alignment of the gears.

*Controlling mechanism for control number wheels*

Figure 9:
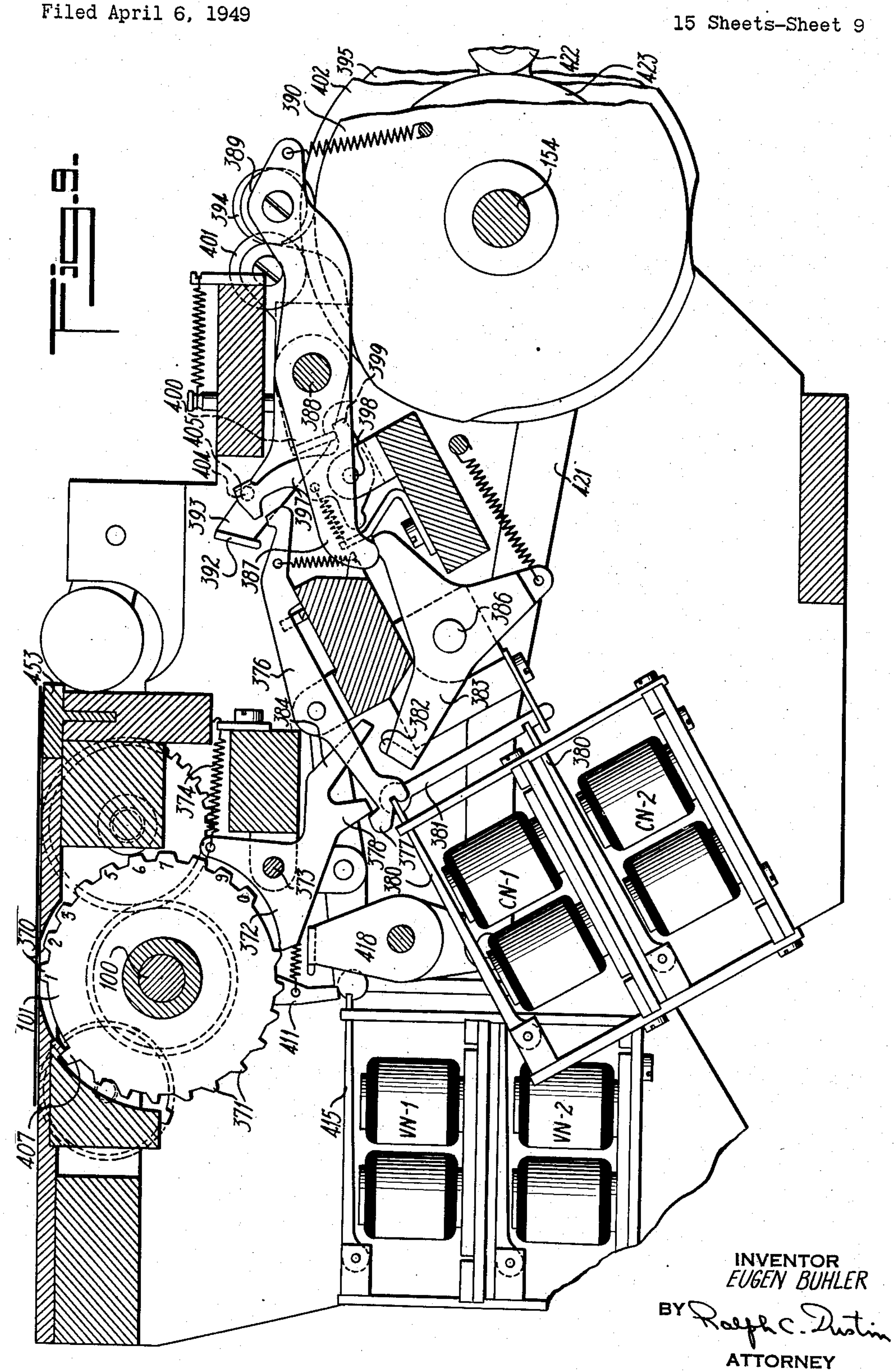

Each of the control number printing wheels 101 is provided, as shown in Fig. 9, with printing elements 370 for printing the significant figures 1 to 9 and the 0 in the order shown. Formed upon the wheels are teeth 371 in positions corresponding to the printing elements 370. Arranged adjacent to each of the printing wheels is a pawl 372 pivotally supported at 373 and urged toward engagement with the teeth by a spring 374. A latch lever 376 is provided with a projecting portion 377 engageable with an arm 378 on the pawl for holding it in its retracted position. The latch lever for the wheel shown in Fig. 9 is operatively connected to the armature 389 of a magnet CN-1, which is operative when energized to rock the latch lever in a direction for releasing the pawl. The next adjacent latch lever 376 is connected by a link 381 to the armature 380 of another magnet CN-2 for effecting its operation. The latch levers controlling the pawls for the other wheels 370 are connected to magnets which are staggered, as shown, for conserving space. For returning the pawls to positions in which they may be engaged by their respective latch levers, there is provided a bail 382 carried by a bell crank 383 and engageable with projecting arms 384 on the pawls. The bell crank 383 is pivotally supported as at 386 and is engaged by a lever 387 pivotally supported at 388 and carrying a roller 389 in operative engagement with a cam 390 fixed to the shaft 154. For moving the levers 376 into their latching positions after the pawls have been retracted, there is provided a bail 392 engageable with the right-hand ends of the latch levers and carried by a lever 393 pivotally supported at 388 and having a roller 394 engaging a cam 395 on the shaft 154. After the print wheels have been set up and the printing operation has been completed, the bell crank 383 is operated to retract the pawls, and then the bail 392 is moved into engagement with the latch levers for moving the latter to their latching positions. At the right-hand end of each of the levers 376 is a latch member 397 pivotally supported at 398 and having an arm 399 engageable by a bail 400 which is pivotally supported at 388 and has a roller 401 engaging a cam 402 on the shaft 154. The latch members 397 are adapted to move over the ends of the levers 376 when the latter are in their latching positions and prevent them from moving to unlatching positions.

In the event that the latch levers are rocked to unlatching positions before the latch members 397 are swung in a counter-clockwise direction, the ends of the levers engage the latch members for holding them in the position shown. Fixed to each of the latch members is a projecting pin 404 which extends under a projecting portion 405 of the latch member controlling operation of the print wheel of the next lower denomination. The latch members are held by the bail 400 in the position shown until the print wheels have passed beyond the point at which their pawls may be released for engaging the #9 tooth. If one of the latch levers is actuated to stop a print wheel in a position for printing any one of the figures 1 to 9, the right-hand end of such lever engages its latch member 397 for holding the latter in its retracted position, and, by reason of the pins 404 and projecting portions 405, the latch members for the wheels of lower denomination are also held in their retracted positions. The latch members for controlling the wheels of higher denomination, however, are free to move over the ends of the latch levers 376 for locking them in their latching positions. Just as the print wheels 101 are moved beyond the point at which their pawls may be released for engaging the #9 tooth, an impulse is delivered to each of the magnets CN, as will be described in connection with the wiring diagram, for releasing all of the latch levers which have not been locked out by the members 397. Those levers which have not been actuated previously to stop the printing wheels in a printing position will be actuated to release their pawls for engaging the 0 tooth. The wheels for the levers which are locked out will continue to rotate in a counter-clockwise direction until a projecting portion 407 on the wheels engage the ends of the pawls for effecting a stopping of the wheels in positions to present the open space between the 0 printing element and the #1 tooth beneath the card.

*Control mechanism for voucher number wheels*

Figure 10:
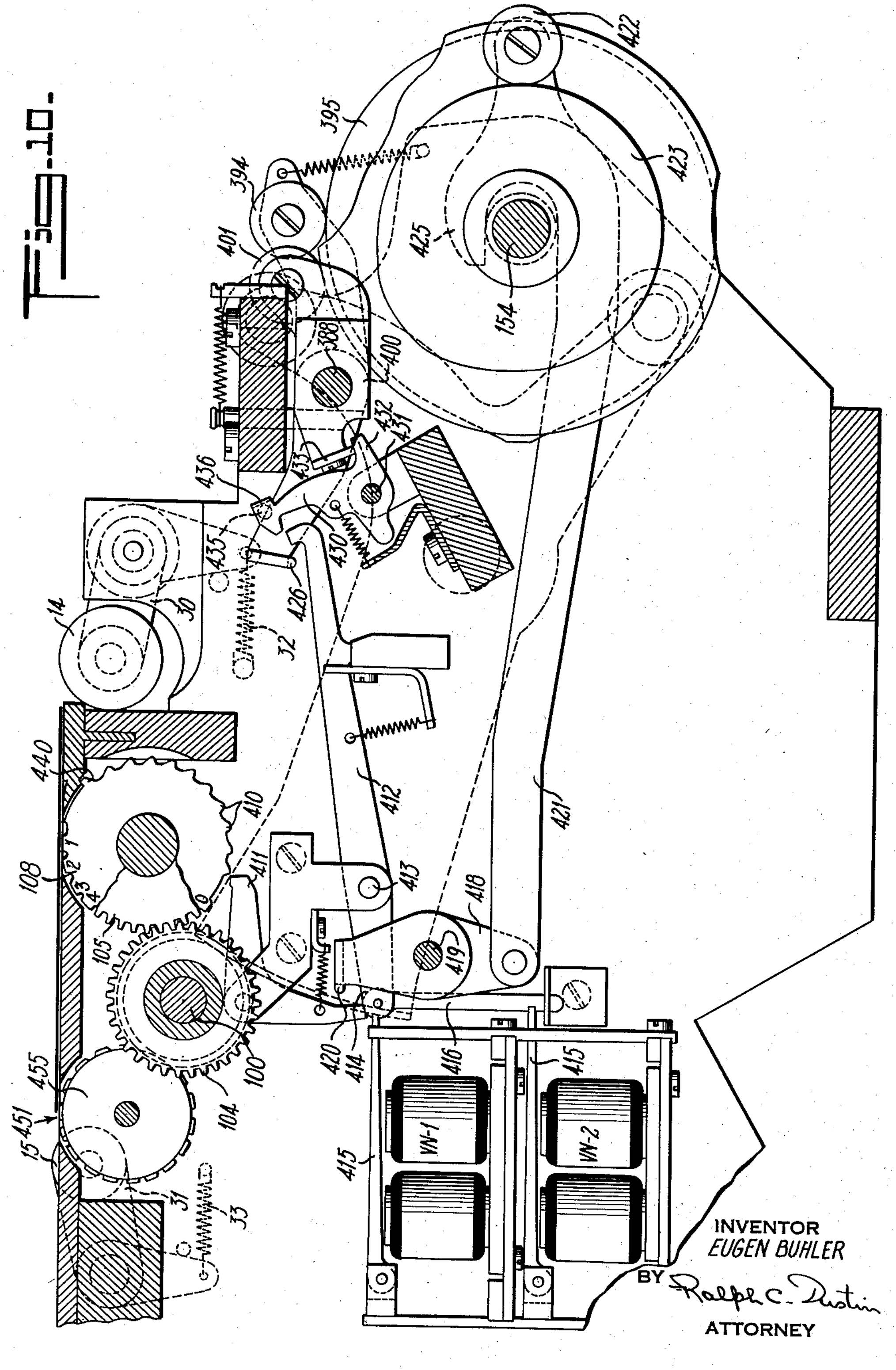

Referring to Fig. 10, it will be noted that the wheels 103 for printing a voucher number upon the cards are provided with elements for printing the numbers 1 to 9 and 0 in the order shown. These wheels are rotated in a clockwise direction while they are being adjusted to print the desirable voucher number. Formed upon each of the wheels are teeth 410 which are adapted to be engaged by a pawl 411 for stopping the wheel in any one of its printing positions. A latch lever 412 is pivotally supported at 413 and is provided with a projecting portion 414 engageable with the pawl for holding it in its retracted position. The latch lever for the wheel shown in Fig. 10 is operatively connected to the armature 415 of a magnet VN1 which is operative when energized for actuating the lever to release the pawl. The next adjacent lever is connected by a link 416 to the armature 415 of a magnet VN2 for controlling its operation. The latch levers controlling the pawls for the other wheels are connected to armatures of magnets which are staggered in a similar manner. For moving the pawls 411 to their retracted positions, there is provided a lever 418 pivotally supported at 419 and carrying a bail 420 engageable with the pawls. A link 421 is pivotally connected to the lever 418 and carries a roller 422 engaging a cam 423 fixed to the shaft 154. A hooked portion 425 on the link 421 engages the shaft 154 for holding the link in a position so that its roller 422 maintains engagement with the cam 423. Cooperating with the latch levers 412 is a bail arm 426 extending from the lever 393 which is controlled by the cam 395, as explained above. After the wheels 103 have been stopped in their various printing positions and the printing operation has been completed, the lever 418 is rocked by the cam 423 to move the pawls to their retracted positions, and the bail arm 426 is then moved into engagement with the latch levers for moving them to their latching positions.

Located at the right-hand end of each of the latch levers 412 is a latch member 430 pivotally supported at 431 and having an arm 432 adapted to be engaged by a bail arm 433 which is fixed for movement with the bail 400 described above. The latch members are adapted to move over the ends of the levers 412 for locking the latter in their latching positions, but, in the event that one of the latch levers is moved to its unlatching position while the latch member associated therewith is held in the position of Fig. 10, the end of the lever engages the face of the latch member for holding it in its unlatching position. Fixed to each of the latch members is a pin 435 extending under a laterally projecting portion 436 on the adjacent latch member so that a holding of one of the latch members by a lever 412 will result in a holding of all the latch members for the wheels of lower order, while the latch members controlling the wheels of higher order are free to move over the ends of the latch levers 412. All of the latch members 430 are held by the bail arm 433 in the position of Fig. 10 until the print wheels have moved just beyond the point where the pawls 411 may be released for engaging the #9 tooth. At this time the bail arm 433 is raised to permit movement of the latch members which are not held in their retracted positions. An impulse is then delivered to all of the magnets VN for actuating the latch levers which are not locked out by the latch members 430 so that each pawl which has not previously been released may engage the 0 tooth. The print wheels controlled by the latch levers which are locked out continue to rotate until a projecting portion 440 on the wheel engages the end of the pawl and stops the wheel in a position to present the open space between the 0 printing element and the #1 tooth in printing position.

*Other printing devices*

Supported by the lower frame structure, as shown in Fig. 6, are adjustable devices 450 and 451 for printing the month, day and year on the check, a replaceable plate 452 for printing the signature, and a replaceable plate 453 for printing the object for which the check is drawn, or any other desired information. The adjustable devices 450 and 451 comprise, as shown in Figs. 8 and 10, wheels 455 which may be adjusted manually to any desired positions and held in place by suitable detenting means, not shown. The signature plate 452 is arranged in a recessed portion of the lower frame structure, as shown in Fig. 7, and is held in place by a screw 458. The plate 453 is also supported by the lower frame structure in a similar manner and is secured in place by any suitable means, not shown.

*Print hammers and their operating mechanism*

Extending transversely of the upper frame structure and rotatably supported by its side plates 22 and 23, as shown in Figs. 1, 4 and 5, is a shaft 460 upon which printing hammers 461 are pivotally mounted. Separate hammers are provided for the different printing devices, and each carries platens 462 which are engageable with the card for forcing the latter into engagement with the various printing elements. Fixed to the shaft 460 is a bail 464 operatively engaging projecting fingers 465 on the hammers for moving the latter to their raised positions against the action of springs 466.

Connected to one end of the shaft 460, as shown in Fig. 5, is an arm 468 carrying a roller 469 in operative engagement with a cam 470 fixed to a shaft 471. Attached to the opposite end of the shaft 471, as shown in Fig. 2, is a gear 472 meshing with the gear 76 to be driven by the latter upon release of the armature latch 62 of the feed clutch. As the cam 470 operates to swing the arm 468 in a counterclockwise direction (Fig. 5), the bail 464 rocks the print hammers 461 to their upper positions where latch members 474 engage projecting portions 475 on the hammers and hold them raised. Continued rotation of the cam 470 results in movement of the bail 464 to its lower position again to permit a printing operation of the hammers upon release of the latches 474. The latches 474 are fixed to a shaft 476 to which there is connected, as shown in Fig. 5, an arm 477 carrying a link 478 which is connected at its upper end to the plunger 479 of a solenoid 480. Formed in the upper portion of the link 478 is an opening 482 which is slightly wider at its low portion to provide a shoulder 483. Extending through the opening 482 is a pin 485 carried by a lever 486 having a roller in operative engagement with a cam 488 fixed to the shaft 471. The shape of the cam 488 is such that the pin 485 is positioned in the lower portion of the opening 482 when the bail 464 is moved to its lower position. While the pin 485 is in this position, the solenoid 480 is energized to move the link 478 in a counter-clockwise direction and position the shoulder 483 above the pin. Continued rotation of the cam 488 results in an operation of the lever 486 to raise the pin 485 against the shoulder 483 and move the link 478 so as to swing the arm 477 in a counter-clockwise direction. The shaft 476 is rotated with the arm 477 for moving the latches 474 to their unlatching positions and releasing the hammers 461. In order that any one of the hammers may be locked out, there is provided for each of the hammers a bell crank 490 pivotally mounted on a shaft 491 and having a pin 492 adapted to be received under a hooked portion 493 on the hammer when the latter is in its raised position. A laterally projecting portion 494 on the bell crank is engageable with shoulders 495 and 496 on a latch member 497 for holding the bell crank so that its pin 492 is in either a locking or unlocking position.

In order to indicate the number of times that any one or more of the hammers are operated, there is provided, as shown in Fig. 5, a counter 500 to which a link 501 is pivotally connected. Formed on the end of the link are forked arms 502 receiving a pin 503 carried by a lever 504 which is pivotally supported at 460 and is engageable at its upper end by the bail 464. Attached to one end of the shaft 476, as shown in Fig. 1, is a latch 505 which is adapted to engage the upper end of the lever 504 after it is swung to its upper position by the bail 464. When the shaft 476 is rocked to release the print hammers, the lever 504 is released at the same time so that it is swung in a clockwise direction, in Fig. 5, by a spring 506 to operate the counter 500.

*Ribbon feed mechanism*

Extending across the various printing devices, as shown in Fig. 13, is an inked ribbon 510 which is wound on spools 511 rotatably supported by brackets 512 carried by the side plates 26 and 27 of the lower frame structure. Each spool is driven through a ratchet 514 by a pawl lever 515 pivotally connected to an arm 516 which is connected to a shaft 517. Another arm 518 on the shaft 517 carries a roller which operatively engages a face cam 520 mounted upon the shaft 154. With the parts in the position shown, the spool at the right is driven in a counter-clockwise direction to draw the ribbon 510 from the spool at the left, thus causing it to rotate in a clockwise direction. When the spool at the left is sufficiently unwound to expose a slot 522, a pawl 523 rocks into the slot and is drawn to the left to shift a link 524 upon which it is pivoted. The link 524 operates through a pin and slot connection 525 to rock a bell crank 526 and effect a swinging of the pawl lever 515 through a toggle spring 528 in a direction to move it out of engagement with the ratchet at the right and into engagement with the ratchet at the left. Pivotally supported by the lower frame structure adjacent each of the ratchets is a detenting pawl 530 with which the link 524 cooperates for adjusting its position. When the pawl lever 515 is in a position for driving one of the ratchets, the detenting pawl 530 for the same ratchet is held in a position by a spring 531 to engage the ratchet teeth and prevent movement in an unwinding direction.

*Sensing devices*

Each of the cards advanced from the feed hopper 11 may contain at any one of nine points in different paths extending transversely thereof, a hole through which sensing devices, such as brushes SB, RB and SRB, are adapted to move into engagement with contact elements 540, as shown in Fig. 4. The brushes are supported by frames 541 attached to the lower side of the upper frame structure, and the contact elements 540 are fixed to plates 542 of insulating material. There are eight each of the brushes SB, RB and SRB arranged for sensing holes representing the cash value of the check. In addition to these eight RB brushes, there are other RB brushes for sensing holes in the card representing the check number, the voucher number and the control number. The brushes SB may be referred to as digit sensing brushes, the brushes RB as reading brushes, and the brushes SRB as series reading brushes. All of the brushes RB are located ten cycle points to the right of the brushes SB so that each of the nine points on the card will have come under the brushes SB and there will be two more points for the card to travel before reaching the brushes RB. The brushes RB control the energizing of the magnets for the small type cash wheels 116, the check number printing wheels 118, the control number wheels 101, and the voucher number wheels 108, while the brushes SRB control only the energizing of the magnets for the large type cash wheels 102. The rotation of all of the print wheels from their home positions is started at the same time and is synchronized with the movement of the card so that each reaches a position to print a number corresponding to the point on the card sensed by its control brush. The first printing element on all wheels except the large type cash wheels is the number 1 element. The number 1 point on the card must, therefore, be over the RB brushes at the time the wheels are started from their home positions. The first two elements on the large type cash wheels are the asterisk and 0 printing elements; therefore, the brushes SRB must be two cycle points to the right of the RB brushes in order that the number 1 elements on the wheels may reach printing positions when the number 1 point of the card reaches a point over the SRB brushes.

When the card reaches a position over the various printing devices, hooked arms 545 (Figs. 2 and 5) are rocked to engage the leading edge of the card and hold it until the hammers 461 have been operated. The arms 545 are fixed to a shaft 546 carrying an arm 547 which is pivotally connected to a bell crank 548. A roller 549 is carried by one arm of the bell crank and engages a cam 550 fixed for rotation with the gear 472. While the card is being held, the feed rolls 14 and 15 slide over the card. The yieldable supporting means for the lower rolls 14 and 15 permits the sliding of the rolls without damage to the card. As soon as the printing operation is completed, the arms 545 are lifted and the card is advanced to the ejector. As each card is advanced from the feed rolls 12, it engages a lever 552 (Fig. 1) and rocks a shaft 553 for closing a pair of card lever contacts CL which are connected in a control circuit, as shown in the wiring diagram.

*Timing cams*

As shown in the wiring diagram of Figs. 14*a*, 14*b* and 14*c*, contacts indicated by a number having a prefix C, F or P, are controlled by cams which may be referred to by the corresponding letter, for completing circuits during predetermined time intervals. The C cams are driven continuously by the motor 53 through a gear 560 (Figs. 2 and 3) which is fixed for rotation with the clutch plate 163. The gear 560 operates through a gear 561 to drive a gear 562 fixed to a shaft 563. Mounted upon the shaft 563, as shown in Fig. 4, are the cams C controlling operation of contacts.

The F cams are driven only when the feed clutch mechanism operates on a release of the armature latch 62 to effect a feeding of the cards. For driving these cams, there is provided, as shown in Fig. 2, a gear 566 meshing with the gear 68 and operating through a gear 567 to drive a gear 568 on a shaft 569 to which the F cams are connected.

The P cams are driven only when the printing clutch mechanism operates on a release of the armature latch 168 to effect a positioning of the print wheels. The drive mechanism for these cams includes, as shown in Fig. 4, a gear 571 meshing with the gear 157 and driving a gear 572 on a shaft 573 to which the P cams are connected.

*Circuit diagram*

The coordination of the various mechanisms described above will now be made clear in a discussion of the wiring diagram shown by Figs. 14*a*, 14*b* and 14*c*. A number of relays are shown on the diagram and in each case they are identified by the letter R. The contacts controlled by the relays are given the same reference characters as the relays, followed by a lower case letter. Thus, R1 represents a relay, and R1*a*, R1*b*, etc., represent contacts operated thereby. To avoid cross-wiring, the contacts are located, in many cases, at points remote from their controlling relays. In addition, the relays are shown dotted adjacent to such remotely located contacts.

Some of the relays are of the type having multiple windings on a common core, and, to simplify the connections, the individual windings are shown separated. The letter P or H in parenthesis is placed adjacent to these windings to indicate whether it is a so-called pick-up or holding winding. Each of these relays is initially energized through its pick-up winding to close contacts which complete a circuit through its holding winding to maintain the contacts closed.

The motor 53 is connected, under the control of a manually operated switch 591, to the conductors 594 and 595 of a power line and operates continuously to drive the clutch plates 58 and 163 of Fig. 3.

To start operation of the card feeding and printing mechanism, a Start Key is operated manually to complete a circuit from the conductor 594 through a Stop Key, a pair of contacts C4 which are closed by their controlling cam at 162°, and the pick-up winding of a relay R1 to the conductor 595. A holding circuit for the relay R1 is then established by the closing of the contacts R1*a* to complete a circuit from the conductor 594 through the cam contacts C3 at 0° and the holding coil of the relay R1 to the conductor 595. The R1*b* contacts are also closed to complete a circuit from the conductor 594 through a manually controlled switch 597 and the feed clutch magnet FC for releasing the armature latch 62 and effecting an operation of the picker and feed rolls to start a card through the machine.

As the card advances, it engages the card lever 552 and closes the card lever contacts CL at 162° in the second machine cycle to complete a circuit through the pick-up winding of relay R2. This provides a second holding circuit for the R1 relay through the Stop Key, the stacker stop switch 51, and the contacts R1*c*, R2*a* and R1*a* so that the relay R1 is maintained energized when the cam contacts C3 open at 180°, and causes the machine to continue running as long as cards are advanced from the feed hopper. The contacts R2*b* are also closed to provide a holding circuit from the conductor 594 through the cam contacts P1 at 18°, and the holding coil of the R2 relay. At the same time, contacts R2*c* close so that the digit sensing brushes SB1—SB8 may be connected to the conductor 594 under the control of the cam contacts C1, C2 and C6, and complete circuits, when holes are sensed in the cards, through the pick-up coils of relays R11—R18 to the conductor 595. The cam contacts C6 are closed just before the #1 point on a card reaches the SB brushes and remain closed until the #9 point has passed under the brushes. In order to prevent sparking at the brushes, the cam contacts C1 and C2 are operated so as to complete the circuit to the brushes just after they have made contact through holes in the card, and to break the circuit again before the brushes are moved away from their contacts. As shown in the timing chart of Fig. 15, the cam contacts C6 are closed at 243° in one cycle and opened at approximately 45° in the next cycle. A hole in the card at the #1 point reaches a position to receive an SB brush at approximately 246° in the second cycle. The cam contacts C2 close at about the same time, and the contacts C1 close at approximately 248° to complete the circuit. Contacts C2 then open at 255° to break the circuit while the brush contact is still closed, and the contacts C1 open a couple of degrees later when the brush is also being moved away from its contact. Contacts C1 and C2 operate to connect the SB brushes to the conductor 594 only as they pass points at which perforations may be located.

When any one of the relays R11—R18 is energized, its corresponding contacts R11a—R18a and R11b—R18b (Fig. 14c) are opened to break circuits controlling the energizing of the magnets LT1—LT8 for the large type print wheels, as will be shortly described. Since the cards may have holes only at points 1 to 9, it will be only the control circuits for the large type print wheels that are to print a significant figure, which will be opened. An energizing of the relays R11 to R18 also effects a closing of its contacts R11c to R18c to provide holding circuits from the conductor 594 through the cam contacts P3 at 250° and the holding coils of the relays.

For controlling the energizing of the magnets LT1 to LT8 of the large type print wheels 102, there is provided, as shown in Figs. 4 and 14b, a delay unit generally designated 600, comprising an annular plate 601 fixed to a hub 602 which is supported by a shaft 603 journaled in the lower frame structure 28. The hub and plate are made of a conducting material, and the hub is insulated from the shaft 603 by any suitable means, not shown. Fixed to the shaft is a bevel gear 604 meshing with a bevel gear 605 on a shaft 606 to which the gear 561 (Fig. 2) is connected. Extending laterally from the plate 601 are annular portions 608 and 609 having notches at spaced intervals for receiving contact members 610. A hooked inner end on each contact member normally engages the lower side of the portion 609 and is held in such position by a spring 612. A frame 614 is attached to the lower frame structure of the machine and carries magnets M1 to M8 which operate when energized to move the hooked end of a contact member out of engagement with the portion 609 so that the spring moves it outwardly until a shoulder 616 on the contact member engages the projecting portion 608. Attached to the frame 614 are contact members D1—D8 having cam surfaces which are engageable by the contact members 610 when the latter are moved to their outer positions. The timing and arrangement is such that the machine operates through two cycle points between the time that a contact member 610 is released by its magnet and the time it is swung angularly to a position where it engages the cam surface of the next contact member D. As the contact 610 is moved over the cam surface, it is forced inwardly to a position where it latches again on the projecting portion 609. This structure is shown and described in the Johnson Patent No. 2,275,396, granted March 3, 1942, and need not be described further herein.

The contact members D1—D8 are connected to the magnets LT1—LT8 of the large type wheels, and the contacts 610 are connected through the hub 602 to the power conductor 595. The magnets M1—M8 are connected at one end to the conductor 595 and are adapted to be connected at their other ends to the conductor 594 through either a circuit including cam contacts F2, F3 and the contacts SPC1—SPC8 which close as the pawls operate to stop the small type wheels, or through another circuit including cam contacts F2, F3, C8, relay contacts R3b and relay contacts R11b—R18b.

At 324° in the second cycle, the cam contacts C5 are closed for energizing the pick-up coil of the relay R3 through a circuit including the card lever contacts CL. The contacts R3a are then closed to establish a holding circuit from the conductor 594 through the cam contacts P2 at 351° and the holding coil of the R3 relay. Contacts R3b are also closed, but a circuit is not completed to the magnets M1—M8 until after the cam contacts C8 close at 57° in the third cycle. The #9 point on the card has just passed beyond the SB brushes at this time and the only contacts of R11b to R18b remaining closed are those of the relays whose brushes SB did not sense a hole in the card. This means that the only magnets M1—M8 to be energized through the R11b—R18b contacts are those for which the large type print wheels are to print either an 0 or an asterisk. As mentioned before, the SB brushes are ten cycle points in advance of the RB brushes so that two points of card travel are required in moving from a position in which an SB brush engages the #9 point to a position in which an RB brush engages the #1 point. The F3 contacts close at approximately the same time as the C8 contacts, and the F2 contacts close a couple of degrees later to complete the circuit to the R11b—R18b contacts. The contacts F3 and F2 then open a few degrees later so that the impulse delivered through contacts R11b—R18b to the magnets M1—M8 is only long enough to release one contact 610 for each magnet energized. Those magnets M1—M8 which are energized operate contacts 610 to engage corresponding contacts D1—D8 two cycle points later, this being the time at which the RB brushes sense the #1 point on the card.

Upon energizing the R3 relay, contacts R3c were also closed to place the connection of the reading brushes RB and the series reading brushes SRB to the conductor 594 under the control of the cam contacts C1, C2 and F1. The contacts F1 close at 63° in the third cycle, and the contacts C1 and C2 operate to make and break the circuits through the brushes while they are sensing perforations at the different points on the card. When the RB brushes sensing the cash amount holes makes contact through the holes in the cards circuits are completed through normally closed contacts R21a to R28a of relays R21 to R28, and the magnets ST for the small type wheels 116. As the brushes RB sensing the holes representing the check number move through the holes and make contact, circuits are completed through corresponding normally closed contacts R21b to R28b and the magnets CK1 to CK8 to control the operation of the check number print wheels 118. Movement of the brushes RB through holes representing the control number causes circuits to be completed through corresponding normally closed contacts R21c to R26c and magnets CN1 to CN6 for regulating the control number print wheels 101. The brushes RB sensing holes which represent the voucher number are adapted to make contact through holes in the card for completing circuits through normally closed contacts R21d to R28d and the magnets VN1 to VN8 controlling the operation of the voucher number wheels 108. The circuits from the small type cash wheels and each of the number print wheels are completed to the conductor 595 through the cam contacts C7 which close at 302°.

When the card reaches a position (approximately 68° in the third cycle) at which the RB brushes sense the #1 point, all of the print wheels are still in their home positions. The brushes sensing holes at this point energize the corresponding magnets for the small type cash wheels and the various number wheels, releasing pawls to stop the wheels in positions for printing #1. The large type cash wheels present an asterisk in their home positions, and the first position in which they can be stopped by pawls is that for printing 0. The magnets M1—M8 energized through the contacts R11b—R18b cause corresponding delay contacts D1—D8 to close at the same time the RB brushes sense the #1 point and to complete circuits from the conductor 594 through cam contacts C1, C2, F1, relay contacts R3c, a conductor 620, the contacts R11a—R18a remaining closed, and magnets LT1—LT8 to the conductor 595. The pawls released by these magnets stop the print wheels 102 in their 0 printing position, and those wheels of higher denomination than any which will be stopped later to print a significant figure, are returned by mechanism described above to positions for printing an asterisk.

As the RB brushes for the magnets of the small type cash wheels sense holes and operate pawls to stop their wheels 116, corresponding stop pawl contacts SPC close to complete circuits through magnets M1—M8 for closing contacts D1—D8 two cycle points later. All of the print wheels are rotated from their home positions as soon as the #1 point on the card is sensed by the RB brushes. Since the SRB brushes are located to sense points on the card two cycle points after they have been sensed by the RB brushes, the SRB brushes will be sensing holes at the same time that contacts D1—D8 close as a result of the energizing of magnets M1—M8 through contacts SPC1—SPC8. The large type print wheels which are to print significant figures are, therefore, controlled by magnets M1—M8 which are energized through the brushes SRB, and the delay contacts for these circuits are closed under the control of contacts SPC which operate as a result of the sensing by brushes RB two cycle points earlier.

Just after the #9 point on the card passes the RB brushes (approximately 221° in the third cycle), the cam contacts P5 are closed to complete circuits from the conductor 594 through the relays R21—R28 to the conductor 595. All of the normally closed contacts of these relays connected in the brush circuits are then opened, and their normally opened contacts are closed to connect the magnets for the print wheels to the conductor 620 so they are energized from the conductor 594 through the cam contacts C1, C2, F1, the relay contacts R3c, the conductor 620, the wheel magnets, and the conductor 595. All of the pawls not previously released or locked out, then operate to stop their wheels in 0 printing positions. The wheels whose pawls are locked out continue to rotate to their last printing positions to present an asterisk, in the case of the small type cash wheels, and an open space on the number wheels.

The card continues to advance until it is stopped by the arms 545 at 279° in the third cycle in a position to be forced by the print hammers into engagement with the print wheels.

At 48° in the third cycle, the cam contacts C9 are closed to energize the pick-up coil of the relay R4 through a circuit which includes the cam contacts P1, the contacts R2b, the cam contacts C9 and the pick-up coil of the relay. Contacts R4a are then closed to establish a circuit from the conductor 594 through the card lever contacts CL and the holding coil for the relay R4 to maintain the latter energized. Another pair of contacts R4b are also closed to energize the pick-up coil of relay R4 from the conductor 594 through the cam contacts P1, the relay contacts R2b and the contacts R4b, so that the relay R4 is maintained energized when the card lever contacts CL open. Another pair of contacts R4c are closed to complete a circuit from the conductor 594 through the switch 597, the relay contacts R1b, R4c, and the magnet PC for the print clutch so as to release the armature latch 168 for effecting operation of the mechanisms described above to position the various printing wheels. All of the wheels are started from their home positions as the RB brushes sense the #1 point on the card and are moved so that their various printing elements reach printing positions in synchronism with the sensing of the different points.

At approximately 108° in the third cycle, the cam contacts P4 are closed to energize the solenoid 480 (Fig. 5) for moving the link 478 to a position where its shoulder 483 overlies the pin 485. The latches 474 for the print hammers are released by the action of the pin 485 against the shoulder 483, at approximately 275° in the third cycle so that the hammers engage the card soon after it has been stopped by the arms 545.

In some cases it may be desired that certain groups of number wheels be positioned to print either the same number on each check or numbers which increase by one with each printing. To obtain this control, there is provided, as shown in Figs. 1 and 5, a transmitter comprising eight indicator wheels 625, each having a gear 627 fixed thereto. Meshing with each of the gears 627 is a gear 628 carrying a ratchet 629 which has ten teeth, the tenth tooth 630 being somewhat deeper than the others. Pivotally mounted upon the axis of the gear 628 is an arm 631 carrying a laterally projecting pin to which pawls 633 are connected for engagement with the ratchet wheels. The pawls are spaced angularly increasing distances from their ratchets so that only the pawl for the units wheel normally engages its ratchet. When the tenth or zero tooth comes under the pawl, it drops far enough so that the pawl for the tens wheel engages its ratchet and moves the wheel one step. For oscillating the arm 631, a link 635 connects its outer end to a lever 636 which is held by a spring 637 in engagement with a cam 638 fixed to the shaft 573 carrying the P cams. Suitable clutch mechanisms, not shown, are provided so that the indicator wheels may be rotated manually to any desired positions. Fixed to each indicator wheel are brush arms 640, 641 which are engageable with contact elements 1 to 9 and with a bus bar 642 of a commutator 643. The contact elements are numbered in the order shown, and the brush arm 640 engages elements 1, 2, 3, 4 and 5 successively while the brush arm 641 engages the bus bar. As the brush arm 640 moves from the #5 element to the bus bar, the brush 641 moves to the #6 element and then to the 7, 8 and 9 elements successively. Before contact is made to the #1 element again, both brushes are stopped in a tenth position on insulating portions. In order that the wheels 625 may remain in some adjusted position, a latch 645 is arranged for movement under the arm 631 so as to hold it in the position to which it is moved by the high part of the cam 638. This mechanism is substantially the same as that disclosed in the Bryce patent No. 1,989,844, granted February 5, 1935.

Associated with the commutators 643 is an emitter comprising an annular member 648 supported in any suitable manner by the lower frame portion of the machine in the position shown in Fig. 4. The member 648 is provided with contact elements 1 to 9, as shown in the wiring diagram of Fig. 14*b*, and a brush arm 649 is connected to the shaft 573 and is moved over the contact elements once during each machine cycle. As shown in the wiring diagram, the contact elements of the emitter are connected to the corresponding numbered contacts of each of the commutators 643. The brush arm 649 is adapted to be connected through a conductor 650 and a plug connection 651 to the relay contacts R3*c*, and the bus bars 642 of the commutators are adapted to be connected through suitable plug connections to the normally closed contacts in the circuits of the print wheel magnets which are to be controlled. When the numbering is controlled through the commutators and the emitter, plug connections 652 are switched from the brush circuits to the bus bars 642 of the commutators.

When it is desired to print a number repetitively, the latch 645 is moved under the arm 631 so that the indicator wheels and their brushes remain in adjusted positions. As the brush arm 649 of the emitter moves over the elements 1 to 9, impulses are delivered to the print wheel magnets at different times in the cycle, depending upon the adjustment of the commutator brushes. If the number printed is to increase successively, the latch 645 is moved to a released position so that the indicator wheels and their brushes may be stepped ahead one point on each cycle of operation.

While there have been shown and described and pointed out the fundamental novel features of the invention as applied to a preferred embodiment, it will be understood that various omissions and substitutions and changes in the form and details of the apparatus illustrated and in its operation may be made by those skilled in the art, without departing from the spirit of the invention. It is the intention, therefore, to be limited only as indicated by the scope of the following claims.

What is claimed is:

1. A card sensing and printing machine comprising, in combination, means for feeding cards perforated in a column one at a time through the machine, a plurality of sensing stations, each station having a sensing device for sensing the same perforations in said column, adjustable members for printing data derived from the card, means operating under the control of one of said sensing devices for adjusting one of said members in a position for printing data represented by the perforations sensed, and means operating under the control of each of said sensing devices for adjusting another of said members to a corresponding printing position.

2. A card sensing and printing machine comprising, in combination, means for feeding cards perforated in a column one at a time through the machine, devices for sensing the same perforations in said column of each card at three different points in its path of travel, adjustable members for printing data upon the card, means operating under the control of one of said sensing devices for adjusting one of said members in a position for printing data represented by the perforations sensed, and means operating under the control of each of said sensing devices for adjusting another of said members to a corresponding printing position.

3. A cyclically operable card sensing and printing machine comprising, in combination, means for feeding cards one at a time through the machine, said cards being perforated at any one of a predetermined number of index points in each of several card columns, devices engageable successively with said index points in each column for sensing perforations, a plurality of denominationally ordered print members, each movable to printing positions corresponding to the number of index point positions and two additional positions, means for moving said printing members synchronously with the sensing of index points to successive printing positions corresponding to said index points and to said additional printing positions in succession after the sensing of the last index point, pawls engageable with said print members for stopping them in their different printing positions, magnets operable when energized to effect a positioning of said pawls to engage their respective print members, means under control of said sensing devices for energizing said magnets upon the sensing of perforations by said devices, means operable when said last index point has been sensed for preventing the positioning of pawls related to the printing members in orders higher than any which have already been stopped in printing positions, means for thereafter energizing the magnets of all orders to position the pawls not previously positioned or prevented from being positioned so as to stop their print members in the first of the two additional printing positions, and means for stopping the print members of the pawls prevented from operation in the second of the additional printing positions.

4. A card sensing and printing machine comprising, in combination, means for feeding cards one at a time through the machine, said cards being perforated at any one of nine index points in each of several card columns, devices engageable successively with said points in each column for sensing perforations, a plurality of denominationally ordered print members movable to positions for printing digits 1 to 9, 0 and an asterisk, means for moving said print members to their 1 to 9 printing positions in synchronism with the sensing of the corresponding index points, and to their 0 and asterisk printing positions in succession after the sensing of the last index point, pawls engageable with said print members for stopping them in their different printing positions, magnets operable when energized to effect a positioning of said pawls to engage their respective print members, means under the control of said sensing devices for energizing said magnets upon the sensing of perforations by said devices, means operable when the last index point has been sensed for preventing the positioning of pawls related to the print members in orders higher than any which have already been stopped in a printing position, means for thereafter energizing all of said magnets to position the pawls not previously positioned or prevented from being positioned so as to stop their print members in 0 printing positions, and means for stopping the print members of the pawls prevented from operation in positions for printing an asterisk.

5. A card sensing and printing machine comprising, in combination, means for feeding cards one at a time through the machine, said cards being perforated at any one of a predetermined number of index points in a column, print members movable to different positions for printing data upon the card, said members adapted to print the same data and arranged for printing at different locations on the card, devices spaced from each other and engageable with said index points for sensing perforations, means for moving said print members so that one reaches different printing positions in synchronism with the sensing of the index points by one of said sensing devices and another reaches corresponding printing positions in synchronism with the sensing of the index points by another of said sensing devices, pawls engageable with said members for stopping them in their printing positions, magnets operable when energized to effect a positioning of said pawls to engage their respective print members, means under the control of said one of said sensing devices for energizing the magnet controlling the pawl of the print member which moves in synchronism with the sensing of index points by said one of said sensing devices, and means dependent upon the positioning of said pawl and the sensing of a perforation by said other of said sensing devices for energizing the magnet controlling the pawl of the print member which moves in synchronism with the sensing of index points by said other sensing device.

6. A card sensing and printing machine comprising, in combination, means for feeding cards one at a time through the machine, said cards being perforated at any one of a predetermined number of index points, a first device engageable successively with said index points for sensing perforations, a print member movable to a number of printing positions equal to at least one more than the number of index points, means for moving said print member to its different printing positions after all of said index points have been sensed by said first device, means controlled by said first device and operating to stop said member in its first printing position if no perforation is sensed in the card, a second sensing device engageable successively with said index points after the last index point has passed beyond said first device, said moving means operating to position said print member in different printing positions following the first in synchronism with the sensing of the index points by said second device, and means operating under the control of said second device for stopping said print member in a position corresponding to the location of a point at which a perforation is sensed by said second device.

7. A card sensing and printing machine comprising, in combination, means for feeding cards one at a time through the machine, said cards being perforated at any one of index points 1 to 9, a first device engageable successively with said index points for sensing perforations, a print member movable to positions for printing digits 0 to 9, means for moving said print member to its different printing positions after all of said index points have been sensed by said first device, means operating under the control of said first device for stopping said member in its 0 printing position if no perforation is sensed in the card, a second device engageable successively with said index points after the last index point has passed beyond said first device, said moving means operating to position said print member in its 1 to 9 printing positions in synchronism with the sensing of the corresponding numbered index points by said second device, and means operating under the control of said second device for stopping said print member in a position corresponding to the location of a point at which a perforation is sensed by said second device.

8. A card sensing and printing machine comprising, in combination, means for feeding the cards one at a time through the machine, said cards being perforated at any one of index points 1 to 9 and said feeding means operating cyclically through a predetermined number of cycle points and advancing each card one index point for each cycle point of operation, print members, a first movable to positions for printing digits 0 to 9 and a second movable to positions for printing 1 to 9 and 0, a first device engageable successively with said index points for sensing perforations, a second sensing device engageable successively with said index points and arranged to sense the first point after the ninth point has passed said first device, a third sensing device engageable with said index points and arranged to sense each point two cycle points after said second device has sensed the same point, means for moving said first print member to its 1 to 9 printing position in synchronism with the sensing of the corresponding numbered index points by said third sensing device and moving said second print member to its 1 to 9 printing positions in synchronism with the sensing of the corresponding numbered index points by said second sensing device, means operating under control of said first device for stopping said first print member in its 0 printing position if no perforation is sensed in the card, means operating under the control of said second device for stopping said second print member in a position corresponding to the location of a point at which a perforation is sensed by said second device, and means operating under the control of said second and third devices for stopping said first print member in a position corresponding to the location of a point at which a perforation is sensed by each of said second and third devices.

9. The machine of claim 8 in which said print members are moved from their home positions simultaneously with the sensing of the first index point by said second device and said first print member is moved to its #1 printing position two cycle points later, and said means for stopping said first print member includes a delay mechanism which becomes operative by the sensing of a perforation by said second device for making said third device effective to stop said first print member on the sensing of a perforation two cycle points later.

10. The machine of claim 8 including means operable to effect an operation of the stopping means for said second print member when the latter is in its 0 printing position if no perforation is sensed by said second sensing device.

11. A card sensing and printing machine comprising, in combination, means for feeding cards one at a time through the machine, said cards being perforated at any one of index points 1 to 9 and said feeding means operating cyclically through a predetermined number of cycle points and advancing each card one index point for each cycle point of operation, print members, a first movable to positions for printing digits 0 to 9 and a second movable to positions for printing 1 to 9 and 0, a first device engageable successively with said index points for sensing perforations, a second sensing device engageable successively with said index points and arranged to sense the #1 point two cycle points after the #9 point is sensed by said first device, a third sensing device engageable with said index points and arranged to sense each point two cycle points after said second sensing device has sensed the same point, means for moving said first print member to its 1 to 9 printing positions in synchronism with the sensing of the corresponding numbered index points by said third sensing device and moving said second print member to its 1 to 9 printing positions in synchronism with the sensing of the corresponding numbered index points by said second sensing device, means including magnets which are operable when energized for stopping said print members, a circuit including said third sensing device and a delay contact unit for controlling the energizing of the magnet for said first print member, a circuit including said second sensing device for controlling the energizing of the magnet for said second print member, said delay contact unit having a winding which is operable when energized for effecting a closing of its contacts two cycle points later, a circuit including normally closed contacts for controlling the energizing of said delay unit winding, means operating in response to the sensing of a perforation by said first sensing device for opening said normally closed contacts, cam actuated contacts in said last mentioned circuit moving to closed positions as the #9 card point passes said first sensing device, another circuit including normally open contacts for controlling the energizing of said delay unit winding, and means operating simultaneously with the stopping means for said second print member to close said normally open contacts.

12. The machine of claim 11 including means for energizing the magnet controlling said second print member when the latter is in its 0 printing position.

13. A card sensing and printing machine comprising, in combination, means for feeding the cards one at a time through the machine, said cards being perforated at any one of index points 1 to 9 in different columns, said feeding means operating cyclically through a predetermined number of cycle points and advancing each card one index point for each cycle point of operation, two groups of print wheels, the wheels of each group arranged to print digits of different order in a number, the wheels of the first group being movable to position for printing an * and 0 to 9 while the wheels of the second group are movable to positions for printing 1 to 9, 0 and *, a first group of brushes engageable successively with said index points in the different columns for sensing perforations, a second group of brushes engageable successively with said index points and arranged to sense the #1 points two cycle points after the #9 points are sensed by said first group of brushes, a third group of brushes engageable successively with said index points and arranged to sense each point two cycle points after said second group of brushes has sensed the same point, means for moving said first group of print wheels to their 1 to 9 printing positions in synchronism with the sensing of the corresponding numbered index points by said third group of brushes and moving said second group of print wheels to their 1 to 9 printing positions in synchronism with the sensing of the corresponding numbered index points by said second group of brushes, pawls movable into engagement with said print wheels for stopping them in their different printing positions, magnets operable when energized for effecting movement of said pawls into engagement with said print wheels, delay contact units having windings which are operable when energized for effecting a closing of contacts two cycle points later, circuits including said third group of brushes and said delay contacts for controlling the energizing of the magnets for the pawls of said first group of print wheels, circuits including said second group of brushes for controlling the energizing of the magnets for the pawls of said second group of print wheels, circuits including normally closed contacts and cam actuated contacts moving to closed positions as the #9 card points pass said first group of brushes for controlling the energizing of said delay unit windings, means operating in response to the sensing of perforations by said first group of brushes for opening said normally closed contacts, circuits including normally open contacts for controlling the energizing of said delay unit windings, and means operating with the pawls of said second group of print wheels for closing said normally open contacts when the pawls are moved into wheel engaging positions.

14. The machine of claim 13, including means for energizing the magnets controlling the pawls of said second group of print wheels when the latter are moved to their 0 printing positions.

15. The machine of claim 13, including means for preventing operation of the pawls for the wheels of said second group lying in positions of an order higher than any stopped in the 1 to 9 printing positions, and means for energizing the magnets controlling the pawls of said second group of print wheels when the latter are in their 0 printing positions to effect a release of the pawls not already released or prevented from operating, the wheels of the pawls which are prevented from operating continuing movement to their * printing positions.

EUGEN BUHLER.

References Cited in the file of this patent

UNITED STATES PATENTS

| Number | Name | Date |
|---|---|---|
| 1,233,699 | Pierce | July 17, 1917 |
| 1,702,863 | Carroll | Feb. 19, 1929 |
| 1,774,051 | Bryce | Aug. 26, 1930 |
| 1,835,466 | Carroll | Dec. 8, 1931 |
| 1,957,193 | Armbruster | May 1, 1934 |
| 2,036,024 | Daly | Mar. 31, 1936 |
| 2,059,797 | Kirkegaard | Nov. 3, 1936 |
| 2,138,649 | Weinlich | Nov. 29, 1938 |